(12) United States Patent
Assion

(10) Patent No.: US 8,241,494 B2
(45) Date of Patent: Aug. 14, 2012

(54) LIQUID FILTER ASSEMBLY

(76) Inventor: Norbert M. Assion, Shelton, CT (US)

( * ) Notice: Subject to any disclaimer, the term of this patent is extended or adjusted under 35 U.S.C. 154(b) by 878 days.

(21) Appl. No.: 11/200,581

(22) Filed: Aug. 9, 2005

(65) Prior Publication Data

US 2006/0037906 A1      Feb. 23, 2006

Related U.S. Application Data

(63) Continuation-in-part of application No. 10/424,448, filed on Apr. 28, 2003, now Pat. No. 7,048,848, which is a continuation-in-part of application No. 09/812,977, filed on Mar. 20, 2001, now Pat. No. 6,605,215.

(60) Provisional application No. 60/602,572, filed on Aug. 18, 2004, provisional application No. 60/611,966, filed on Sep. 21, 2004.

(51) Int. Cl.
*B01D 29/00* (2006.01)
*B01D 27/14* (2006.01)
*B01D 27/00* (2006.01)

(52) U.S. Cl. ........ 210/314; 210/132; 210/340; 210/440; 210/443; 210/488; 210/496; 210/510.1

(58) Field of Classification Search .......... None
See application file for complete search history.

(56) References Cited

U.S. PATENT DOCUMENTS

| | | | |
|---|---|---|---|
| 2,297,248 A * | 9/1942 | Rudolph | 521/145 |
| 2,843,268 A | 7/1958 | Kennedy | 210/130 |
| 3,021,955 A | 2/1962 | Joyce | 210/132 |
| 3,245,541 A | 4/1966 | Silverwater | 210/307 |
| 3,262,563 A * | 7/1966 | Pall | 210/90 |
| 3,269,541 A | 8/1966 | Neely | 210/132 |
| 3,353,680 A * | 11/1967 | Niebergall | 210/314 |
| 3,390,774 A * | 7/1968 | Neely | 210/132 |
| 3,467,256 A | 9/1969 | Humbert, Jr. et al. | 210/132 |
| 3,556,304 A * | 1/1971 | Collard et al. | 210/489 |
| 3,586,171 A * | 6/1971 | Offer | 210/136 |
| 3,726,403 A * | 4/1973 | Shaltis | 210/132 |
| 3,975,273 A * | 8/1976 | Shaltz et al. | 210/790 |
| 3,986,960 A | 10/1976 | Wire et al. | 210/232 |
| 4,048,071 A | 9/1977 | Yamada et al. | 210/90 |
| 4,356,791 A * | 11/1982 | Ward et al. | 210/338 |
| 4,557,829 A | 12/1985 | Fields | 210/132 |
| 4,609,465 A * | 9/1986 | Miller | 210/323.2 |
| 4,738,776 A * | 4/1988 | Brown | 210/167.05 |
| 4,761,232 A | 8/1988 | Bright | 210/500.36 |
| 5,151,180 A * | 9/1992 | Giordano et al. | 210/264 |
| 5,178,753 A | 1/1993 | Trabold | 210/130 |
| 5,552,065 A | 9/1996 | Meddock et al. | 210/808 |

(Continued)

FOREIGN PATENT DOCUMENTS

DE       37 044 68 A1      8/1988

(Continued)

*Primary Examiner* — Benjamin Kurtz
(74) *Attorney, Agent, or Firm* — Harrington & Smith

(57) ABSTRACT

A liquid filter assembly including a first liquid filter element adapted to filter particles larger than a first size; a second different liquid filter element adapted to filter particles larger than a second size; a housing having the first and second liquid filter elements therein. The second size is smaller than the first size. The housing forms a first liquid flow path having the first liquid filter element therein, and a second liquid flow path having the second liquid filter element therein. The second filter element comprises a formed porous polymer member.

9 Claims, 34 Drawing Sheets

U.S. PATENT DOCUMENTS

| | | | |
|---|---|---|---|
| 5,556,543 A | 9/1996 | Trabold | 210/435 |
| 5,888,383 A | 3/1999 | Cox | 210/130 |
| 5,895,568 A * | 4/1999 | Koltunov | 210/130 |
| 6,030,558 A | 2/2000 | Smith et al. | 264/41 |
| 6,037,048 A * | 3/2000 | Peterson et al. | 428/297.4 |
| 6,136,189 A * | 10/2000 | Smith et al. | 210/266 |
| 6,350,379 B1 | 2/2002 | Roll et al. | 210/323.2 |
| 6,599,428 B1 * | 7/2003 | Douglas | 210/668 |
| 6,605,215 B2 | 8/2003 | Assion | 210/253 |
| 7,048,848 B2 * | 5/2006 | Assion | 210/117 |
| 2003/0222010 A1 * | 12/2003 | Bassett et al. | 210/312 |

FOREIGN PATENT DOCUMENTS

| | | |
|---|---|---|
| GB | 1133860 | 11/1968 |
| JP | 45-7112 | 3/1970 |

* cited by examiner

LIQUID FILTER ASSEMBLY

CROSS-REFERENCE TO RELATED APPLICATION

This application claims priority under 35 U.S.C. §119(e) on U.S. Provisional Patent Application No. 60/602,572 filed Aug. 18, 2004 and U.S. Provisional Patent Application No. 60/611,966 filed Sep. 21, 2004 which are hereby incorporated by reference in their entireties, and is a continuation-in-part patent application of application Ser. No. 10/424,448 filed Apr. 28, 2003, now U.S. Pat. No. 7,048,848, which is a continuation-in-part patent application of application Ser. No. 09/812,977 filed Mar. 20, 2001, now U.S. Pat. No. 6,605,215.

BACKGROUND OF THE INVENTION

1. Field of the Invention

This invention relates generally to filtration systems and methods and, more particularly, to a filter assembly intended to remove impurities from a liquid, such as a lubricant, and, more specifically still, to a hybrid spin-on oil filter assembly for use with an internal combustion engine which provides a dual-stage filtering action that includes a first oil filter section in combination or in parallel with a second bypass oil filter section.

2. Brief Description of Prior Developments

U.S. Pat. Nos. 4,761,232 and 6,030,558, which are hereby incorporated by reference in their entireties, disclose porous plastic or polymer members. Conventional internal combustion engines used in automobiles and similar vehicles include a spin-on oil filter assembly for cleaning the motor oil. However, due to the fact that the conventional oil filter assembly only effectively removes particles of size 10 microns and larger, after some period of time smaller particles build up in the engine oil and require that the engine oil be replaced. Typical engine oil, and oil filter, replacement schedules are every 3,000 miles or three months, whichever occurs first.

It is known in certain types of vehicles, such as large trucks, to use an auxiliary bypass filter for additional filtering. A typical bypass filter retrofits to the truck engine where it diverts oil through a finer auxiliary filter element at a slower flow rate than the normal oil filter (e.g. 2.5 gallons per minute or less versus about 20 to 40 gallons per minute). Passing the engine oil through the auxiliary filter element aids in filtering out particles smaller than about 40 microns in size, thereby improving engine oil life as well as the life of the engine. Reference in this regard can be had to, for example, U.S. Pat. No. 5,552,065, Meddock et al.

However, this type of filtering arrangement is not typically suitable for use with automobiles and similar types of vehicles. A first issue relates to the difficulty in retrofitting a bypass oil filter assembly to the engine. In many cases there may simply not be room to mount the bypass oil filter assembly. A second issue relates to cost, as the use of the bypass oil filter assembly is inherently more costly than the use of only the conventional type of oil filter assembly.

As can be appreciated, there is a significant body of prior art that has been built up over the decades relating to oil filters and related techniques for internal combustion engines. Representative of this prior art are the following U.S. Patents.

In U.S. Pat. No. 3,986,960, Wire et al., describe a fluid filter containing a tubular canister having a contaminated fluid inlet and a filtered fluid outlet. The filter includes a solid tube forming a vertical central conduit within the canister and a plurality of axially space-apart containers mounted serially along the tube. Filtering material is located in the canisters. Ports in the tube communicate with chambers formed between the filter element and the bottom of the container. A seal is effected between the outlet of the canister and the tube, while fluid communication is provided between the inlet and the open tops of the containers such that fluid flow occurring between the inlet and the outlet takes place through the filter elements.

In U.S. Pat. No. 4,048,071, Yamada et al. describe a liquid filtering device where the peripheral surface of a coil of a filter web wound about a hollow shaft is covered by a liquid-impervious flexible coating, and the outer periphery of a first end of the coil is secured to a supporting disc so that when liquid to be filtered is caused to pass through the coil in the axial direction of the coil, the convolutions of the coil near a second end expand radially outwardly to trap contaminants in the spiral gap. Purified liquid collected at the first end of the coil is discharged through the hollow shaft. The filter unit is constructed such that a number of unites can be connected in series.

In U.S. Pat. No. 4,738,776 Brown describes a lubricant filter assembly for an internal combustion engine that includes a head member removably mounted on a base member. The head member includes a sleeve-like housing open at one end and having first and second filter units fixedly mounted therein. The outer peripheries of the filter units coact with the interior surface of the housing to form a common inlet passage. One of the filter units is provided with an interior first outlet passage which communicates with a first passage formation formed in the base member. The first passage formation communicates with a first lubricating circuit of the engine. The second filter unit is provided with an interior second outlet passage which communicates with a second passage formation formed in the base member. The second passage formation communicates with a second lubricating circuit of the engine. Seal sections are carried by the head member. One seal section effects a sealing engagement between the base member and a portion of the housing defining the open end. A second seal section is disposed within the housing and prevents direct communication between the inlet passage and the first outlet passage. A third seal section is disposed within the housing and prevents communication between the first and second outlet passages. The sealing engagement effected by the third seal section is enhanced upon the flow pressure within the interior first outlet passage being increased.

In U.S. Pat. No. 5,178,753 Trabold describes an oil filter for internal combustion engines that is used in a secondary oil circuit in addition to a conventional oil filter. The oil filter includes a filter housing in which a filter element consists of a roll of absorbent paper that is wound about a rod. The oil filter is configured as a set of elements that comprises body sections and caps, and a rod with the rolled filter element. The volume of the oil filter can be matched to a particular application by connecting a plurality of body sections with an appropriate number of rods.

In U.S. Pat. No. 5,556,543 Trabold describes an oil filter for internal combustion engines. The oil filter includes a filter housing and a filter packing made of a porous deformable material, e.g., a roll of absorbent paper. To prevent the filter packing from being deformed and thereby preventing a smooth flow through the filter packing, stabilizing elements, e.g., stabilizing bars, are provided for fixing the form and position of the filter packing within the filter housing.

A long-felt and unfulfilled need exists to provide an oil filter assembly for an internal combustion engine that provides, within a conventionally-sized oil filter container, a conventional oil filter and a bypass oil filter capable of entrapping and, thus, removing smaller particles from the oil than the conventional oil filter.

SUMMARY OF THE INVENTION

In accordance with one aspect of the invention, a liquid filter assembly is provided comprising a first liquid filter element adapted to filter particles larger than a first size; a second different liquid filter element adapted to filter particles larger than a second size, the second size being smaller than the first size; and a housing having the first and second liquid filter elements therein. The housing forms a first liquid flow path having the first liquid filter element therein, and a second liquid flow path having the second liquid filter element therein. The second filter element comprises a formed porous polymer member, or alternatively a carbon polymer combination.

In accordance with another aspect of the invention, a liquid filter assembly is provided comprising a first liquid filter element adapted to filter particles larger than a first size; a second different liquid filter element located at least partially above the first filter element and adapted to filter particles larger than a second size, the second size being smaller than the first size; and a housing having the first and second liquid filter elements therein. The housing forms a first liquid flow path having the first liquid filter element therein, and a second liquid flow path having the second liquid filter element therein. The second filter element comprises a molded porous member comprising a polymer material. Alternatively the member could be die cast and later cut or stamped.

In accordance with another aspect of the invention, a liquid filter assembly is provided comprising a first liquid filter element adapted to filter particles larger than a first size; a second different liquid filter element adapted to filter particles larger than a second size, the second size being smaller than the first size; and a housing having the first and second liquid filter elements therein. The housing forms a first liquid flow path having the first liquid filter element therein, and a second liquid flow path having the second liquid filter element therein. The second filter element comprises an extruded porous member comprising a polymer material.

In accordance with one method of the invention, a method of manufacturing a liquid filter assembly is provided comprising providing a first filter element having a general ring shape; providing a second filter element, the second filter element comprising a formed porous polymer member; connecting the second filter element to the first filter element; and locating the first filter element and the second filter element in a housing, wherein a first liquid flow path is provided in the housing through the first filter element and a second liquid flow path is provided in the housing through the second filter element, and wherein the first and second flow paths merge in a central area inside the general ring shape of the first filter element.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

By way of introduction, a hybrid oil filter assembly (HOFA) integrates two filter systems into one spin-on filter housing, and may be used to replace the conventional spin-on oil filter assembly for internal combustion engines found in automobiles, vans, buses, trucks, heavy machine equipment, other internal combustion motor applications and hydraulic systems.

The HOFA can be mounted exactly the same as a normal, conventional spin-on oil filter. The HOFA can be implemented using the same form factors, sizes and threads as every other currently available spin-on filter.

A significant difference between the HOFA design and the conventional spin-on motor oil filter is an ability to filter the engine oil micro-fine clean. In practice, the filtered motor oil can become as clean or cleaner than new, unused motor oil. The cleaning process provides an ability to remove particles of size about one micron or greater. The micro-cleaned motor oil protects the movable engine parts and thus prolongs the active engine life. Furthermore, the normal oil change interval can be prolonged to, as an example, 15,000 miles or greater.

Figure 1:
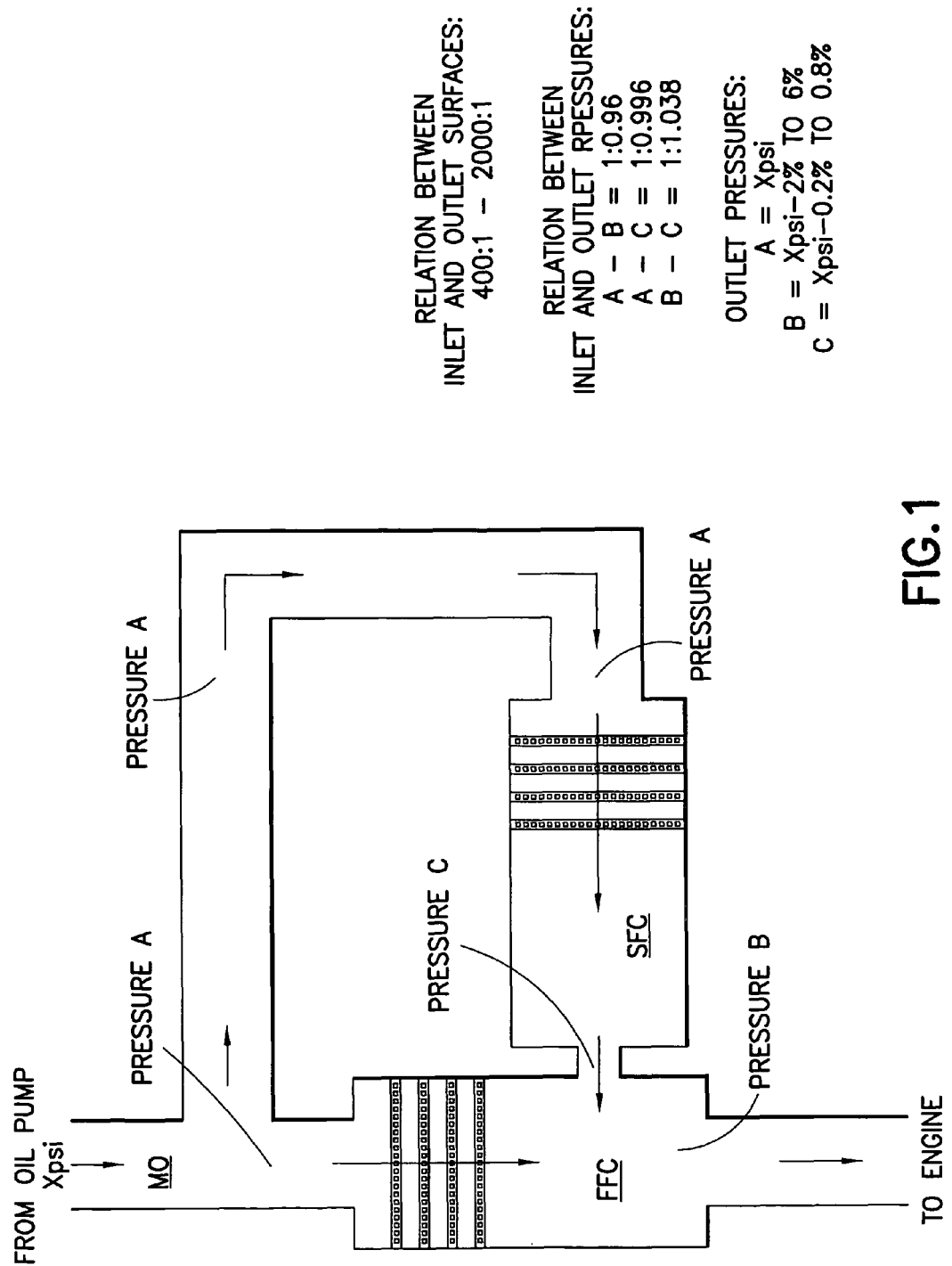
FIG. 1 is diagram depicting the oil flow paths and typical pressures of the hybrid oil filter assembly in accordance with the teachings of this invention.

Referring to FIG. 1, motor oil (MO) arrives from the motor oil pump of the engine and passes through holes in the bottom of the filter housing into the HOFA (Point A). Most of the oil enters a first oil flow path containing a first filter chamber (FFC), while a significantly smaller portion of the oil enters a second oil flow path containing a second filter chamber (SFC). The first oil filter chamber is substantially filled with a first (conventional) filter media, such as pleated paper, and is filtered in a conventional manner. By example, the first filter chamber removes particles down to a size of about 10 microns. The second filter chamber is substantially filled with a second filter media, such as rolled cellulose or paper, or glass wool, or plastic, or cotton, or mixtures of these and other filter materials, and is filtered (micro-filtered) so as to remove particles that are smaller in size than the particles removed in the first filter chamber. For example, the particles removed in the second filter chamber may be as small as about one micron. The oil pressure at the outlet of the second filter chamber (designated C) is about 0.2% to about 0.8% less than the inlet pressure of x psi at point A. The oil pressure at the outlet of the first filter chamber (designated B) is about 2% to about 6% less than the inlet pressure of x psi at point A. Since the filtered oil from the second filter chamber is injected under significant pressure into the first filter chamber, the interior volume of the first filter chamber also serves as a mixing zone wherein turbulent mixing occurs between the filtered oil in the first filter chamber (FFC) and the micro-filtered oil injected from the second filter chamber (SFC). Micro-filtered oil in the context of this invention includes oil that has been subjected to a filtering or cleaning operation wherein particles of a smaller size (e.g., down to about one micrometer) are retained than are retained in the primary or conventional oil filter element (e.g., about 10 micrometers).

FIG. 1 also shows the relationships between the inlet and outlet surface areas, and the relationships between the inlet and outlet pressures.

Figure 2:
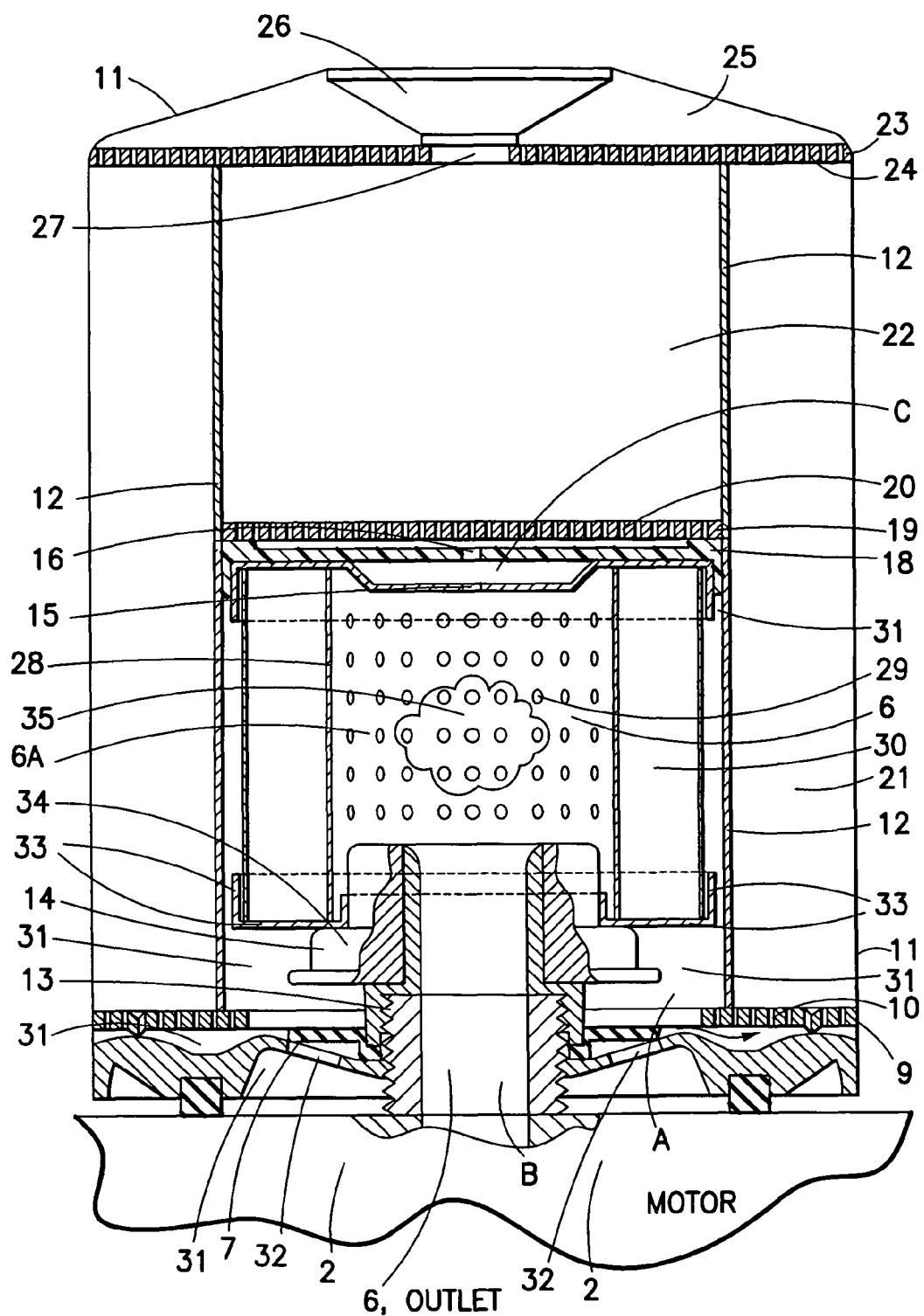
FIG. 2 is a cross-sectional view of one presently preferred embodiment of the hybrid oil filter assembly.
Figure 2A:
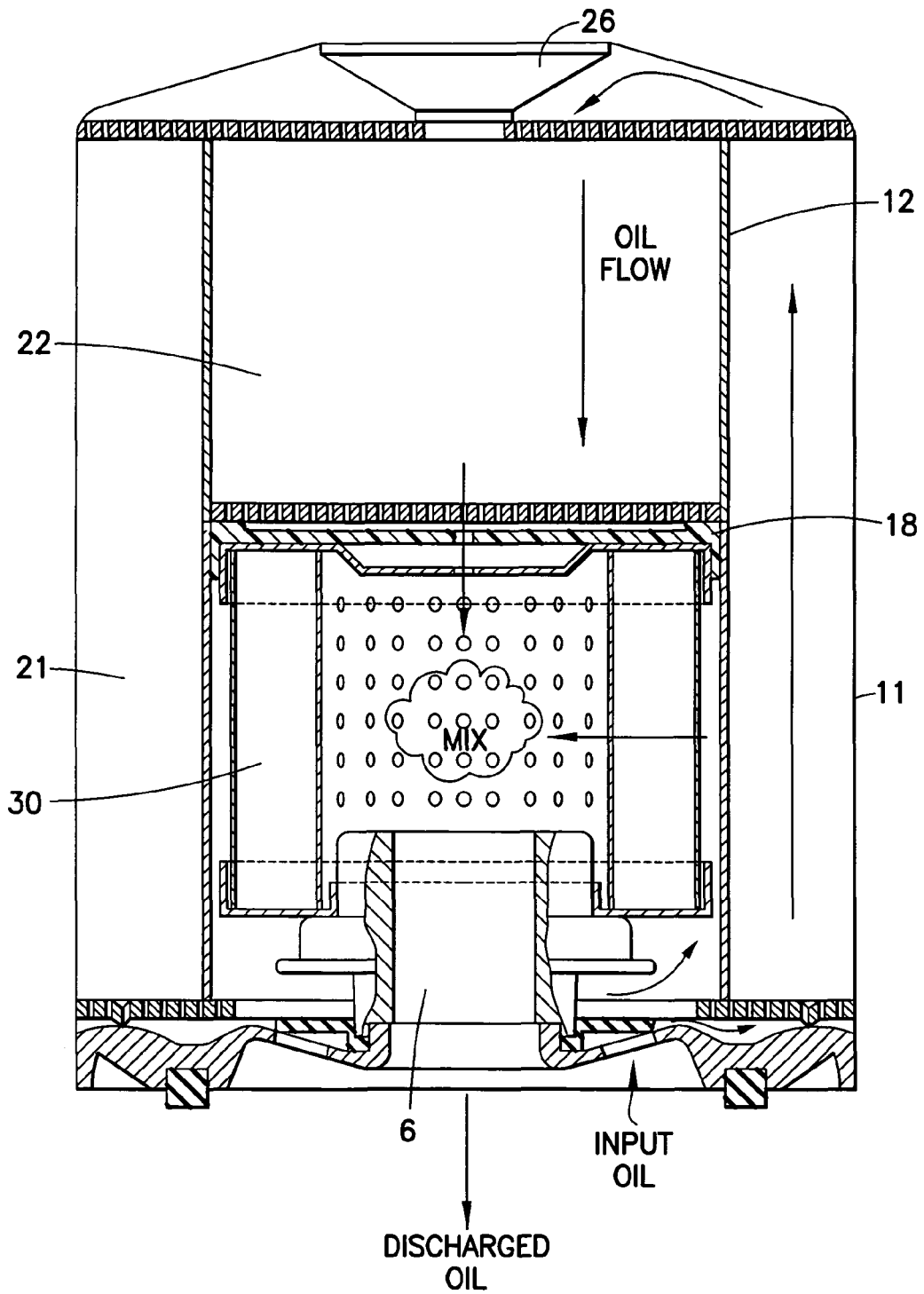
FIG. 2A is a simplified cross-sectional view of the embodiment of FIG. 2 with the internal filtering material removed so as to more clearly show the various inner volumes of the hybrid oil filter assembly.

Referring to FIGS. 2 and 2A, motor oil 2 arriving with high pressure from the engine's oil pump passes through holes 32 in the bottom of the filter housing. Oil fills all of the spaces 31 beneath and above the holes 32 before entering the filter housing 11 and encountering the two types of filter media.

One filter media is a filter element 30 which forms part of the normal or conventional filter. The filter element 30 may be a conventional pleated paper type of filter material. Filter element 30 rests in a collar 33 supported by an assembly 14 that includes a threaded insert 13 for engaging in a conventional manner threads that protrude from the motor housing. An oil holding valve 7 may be provided to limit oil spillage during filter spin-off.

A second filter media includes a first filter package embodied, in a preferred but not limiting embodiment, as a first micro-filter paper element or insert 21 that is positioned circumferentially about the first filter element 30, and is separated therefrom by a tube 12. The second filter media further may also include a second filter package embodied, in a preferred but not limiting embodiment, as a second micro-filter paper element or insert 22 positioned over the top of the normal filter element 30. In this case the tube 12 is longer than the filter element 30 and separates the two micro-filter elements or inserts 21, 22. Fluid communication between inserts 21 and 22 is made through an open space 25 at the top of the filter housing 11, and through a top outlet/inlet plate 23 having a plurality of holes 24. A spacer element 26 is placed between the top surface of the end of the filter housing 11 and the top plate 23 for urging the plate 23 against the top surfaces of the filter inserts 21 and 22. A bottom filter plate 19 having holes 20 is located beneath the second micro-filter element 22, above a back pressure valve 18, preferably made of silicone, which is disposed over the housing from filter 30 to provide a seal between all other filter mediums and oil chambers. The back pressure valve/seal has a centrally located orifice 16. Micro-filtered oil flows through the orifice 16 into the volume of the filter center 6A where it mixes with the oil filtered through the first filter media element 30.

In operation, the greatest volume of incoming oil passes through holes 32 to the side surfaces of the first filter media element 30, and the cleaned oil enters the space or void 6A at the center of the normal filter element 30. From here the cleaned oil flows to the bearings and other parts of the engine.

A smaller volume of oil passes through holes 10 of a main inlet plate 9 (see also FIGS. 4, 6, 7, 8), with the same pressure as the oil that passes into the filter element 30, and in through the filter elements 21 and 22. The oil passes to the bottom surface of the micro-filter element 21, through holes 24 of the upper outlet/inlet plate 23, through the length of the second filter element 21, and arrives at the space 25 at the top of the filter housing 11. The micro-fine filtered oil exits the space 25, passes through additional holes 24 of the upper plate 23, passes through the second micro-filter paper element or insert 22, passes through holes 19 in plate 20 to the back pressure valve 18 and flows out through the orifice 15 of the top collar of the first filter into the volume of the filter center region 6A. Once the micro-filtered oil arrives in the center region 6A of the normal filter portion the micro-fine filtered oil is mixed with the normally filtered oil. The mixed clean oil then flows to the engine through the conduit or outlet 6.

The HOFA design employs a ratio of distribution of the oil and its pressure. More particularly, the HOFA operates based on the respective ratios of the different pressures in different parts of the filter, resulting from different oil flow volumes.

The incoming oil 2 from the oil pump flows under pressure into the filter housing 11 and passes through the two different filter media 21/22 and 30. The pressure on all surfaces is equal, i.e., on the surface of the normal filter element 30, on the surface of the micro-filter elements 21/22, and on the surface of the main inlet plate 9. The oil passes relatively quickly through the pleats of the normal filter element 30, but requires significantly more time to pass through the finer texture of the micro-filter elements 21/22. In a presently preferred embodiment the micro-filter elements 21 and 22 are tightly rolled paper. The paper may be similar to that of bathroom tissue, but may be manufactured for use in the HOFA. As a consequence about 95% of the incoming oil 2 passes through the normal filter element 30 and the cleaned oil flows out of conduit 6, at lower pressure, in the direction of the engine. Meanwhile, the same incoming pressure forces about 5% of the incoming oil 2 through the micro-filter element 21, through the space 25 above the micro-filter element 21, through the upper outlet/inlet plate 23, through micro-filter element 22, through the back pressure valve 18 and then through the outlet orifice 15. This micro-filtered oil mixes at open area 35 in the void 6A with the normally filtered oil that passes through normal filter element 30, and thus joins the filtered oil passing through conduit 6 into the engine. Over time, all of the engine oil will pass through the micro-filter elements 21 and 22, and particles smaller than those trapped in the normal filter element 30 are retained and filtered out of the oil stream, which is the desired result.

Based on the determined ratios between oil pressure, inflow volume, outflow volume, inlet surface and outlet surface in the micro-filter portion of the HOFA, the micro-filtered oil flows through the outlet orifice 15 with a higher pressure than the pressure of the oil within the normal filter portion. Since the incoming oil volume cannot flow out at the same time through the orifice 15 at the top of the normal filter portion, consequently it forms a high oil pressure inside and around the micro-filter element inserts 21 and 22, which has typically the same oil pressure as the pressure in the line coming from the oil pump. The result is that the micro-filter element inserts 21 and 22 are constantly immersed or saturated in the oil, and the microscopic pores stay open and do not become compressed. The oil flow is thus normal in all directions within the cellulose package (micro-filter element inserts 21 and 22), and particles of size about one micron and greater are captured and retained in the filter element inserts 21 and 22. In the presently preferred, but not limiting, embodiment the ratio between the inlet area and the outlet area is about 400:1 at a pressure ratio of about 1:0.996.

Contrary to the micro-filter portion, the difference between the inlet and outlet pressure of the normal full flow filter 30 is greater than the difference between the inlet pressure and the outlet pressure of the micro-fine filter elements 21 and 22. The resistance in the engine is less than at the outflow orifice in the micro-filter portion and the outflow from the full flow filter. A reason for this behavior relates to the resistance of the engine oil exiting the micro-filter portion at orifice 15. The ratio between inlet and outlet pressure of the full flow filter 30 is about 1:0.96. The ratio between inlet and outlet pressure of the bypass filter 21, 22 is about 1:0.996. The flow through the bypass filter 21, 22 is slower than the flow through the full flow filter 30, but because the size of the outlet from the bypass filter is so small, the pressure drop across the bypass filter 21, 22 is smaller than the pressure drop across the full flow filter.

The above explanation of the different behaviors of the two filtering zones within the filter is an important consideration in explaining the operation of the filter. The pressure differential causes the high pressure micro-fine cleaned oil to exit from the space 25 at the top of the filter housing 11, to be forced through the micro-filter media 22 and through the orifice 15 in order to be mixed with the cleaned oil within the mixing volume 6A of the normal filter 30.

FIGS. 3-12, illustrating various components that were described above, provide further details of the placement of the components, their shapes, and the construction of the HOFA.

In the illustrated embodiment the filter housing 11 has a total length of about 130 mm and a diameter of about 93 mm. The thickness of the micro-filter insert 21 is about 13.5 mm, the diameter of the micro-filter element 22 is about 62 mm, the diameter of the normal filter element 30 is about 55 mm, and the diameter of the central volume 6A is about 35 mm. The diameter of the orifice 15 is about 3.0 mm, and the ratio of total inlet area (the holes 10 in the inlet plate 9) to the orifice 15 is about 1:400. The length of the first micro-filter element 21 is about 110 mm, the length of the second micro-filter element 22 is about 45 mm, and length of the conventional oil filter element 30 is also about 45 mm. In alternate embodiments, the dimensions could be more or less. The above described embodiment is merely exemplary.

In one embodiment the fluid communication path comprises an orifice providing passage for filtered oil into the open inner volume of the first oil filter element; the orifice having a flow path area that is smaller than a flow path area of said second oil inlet. In one embodiment a ratio of the area of the second oil inlet to the area of said orifice is about 400:1 or greater.

The foregoing and other dimensions, materials, pressures and the like are exemplary, and are not to be construed as being a limitation upon the practice of this invention.

Figure 2B:
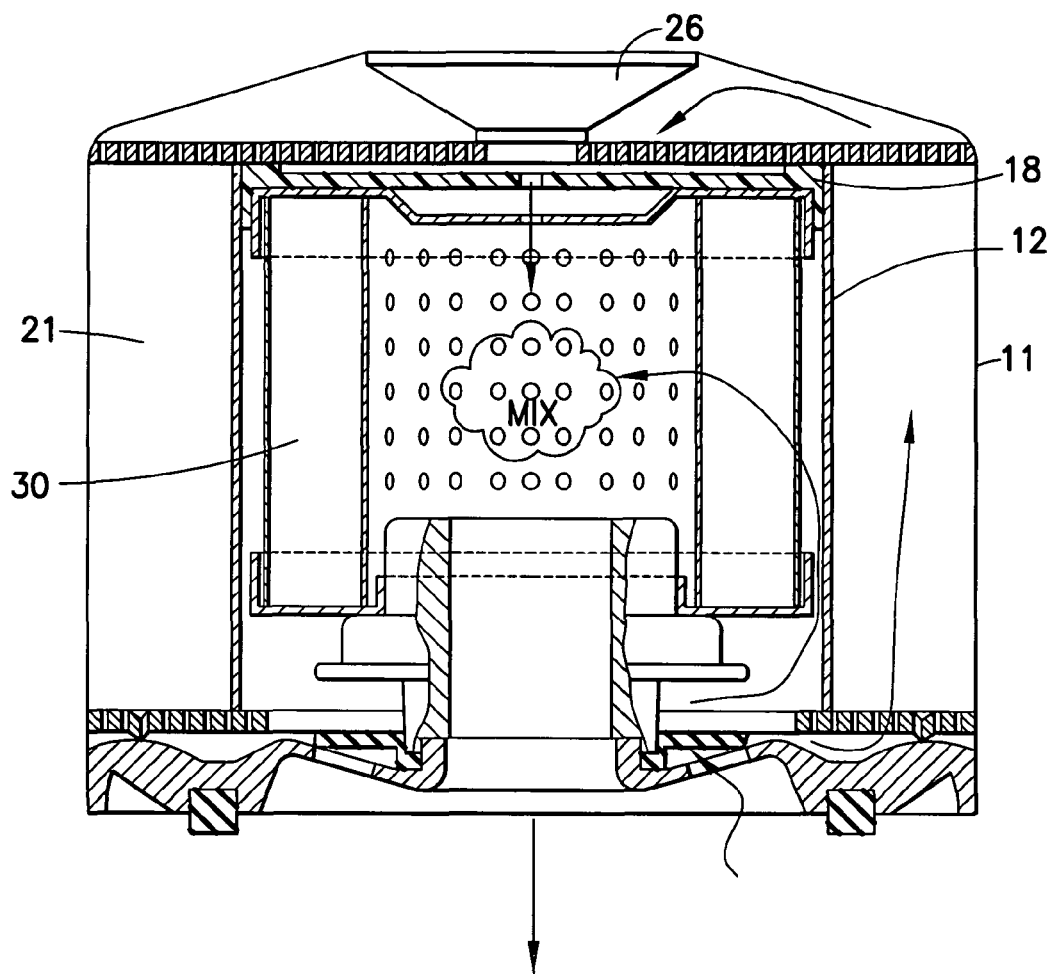
FIG. 2B is a cross-sectional view of another presently preferred embodiment of the hybrid oil filter assembly.
Figure 3:
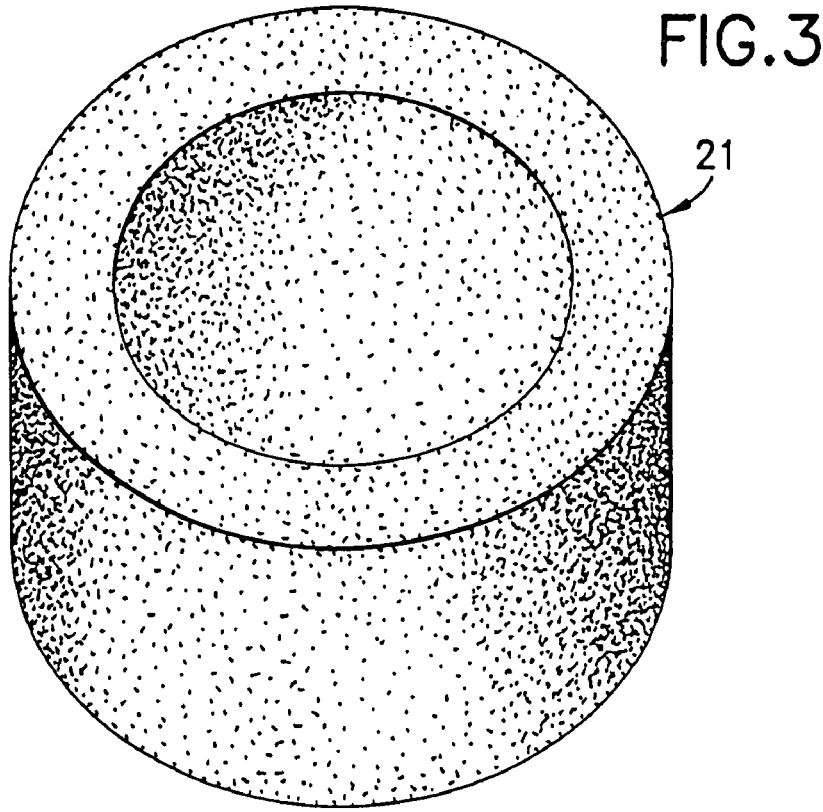
FIG. 3 is an elevational view of a first micro-filter element insert.
Figure 4:
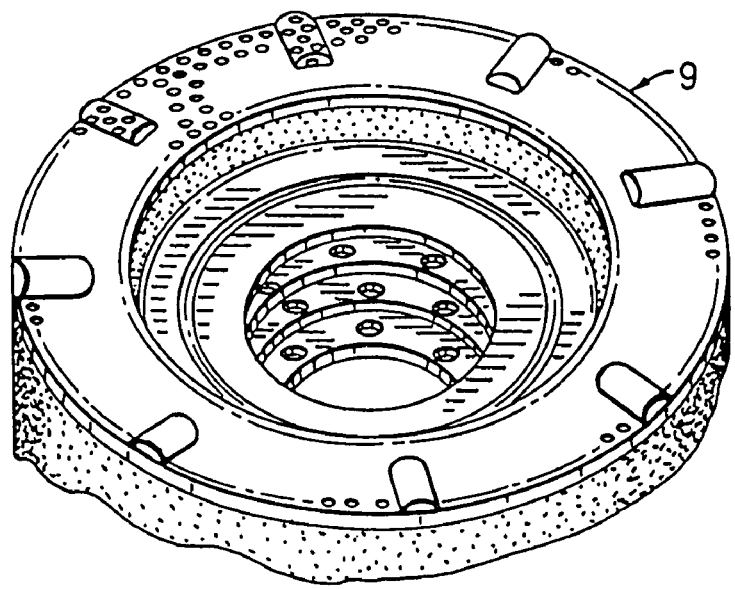
FIG. 4 is a bottom view (looking from the motor) of the normal filter element and the main inlet plate.
Figure 5:
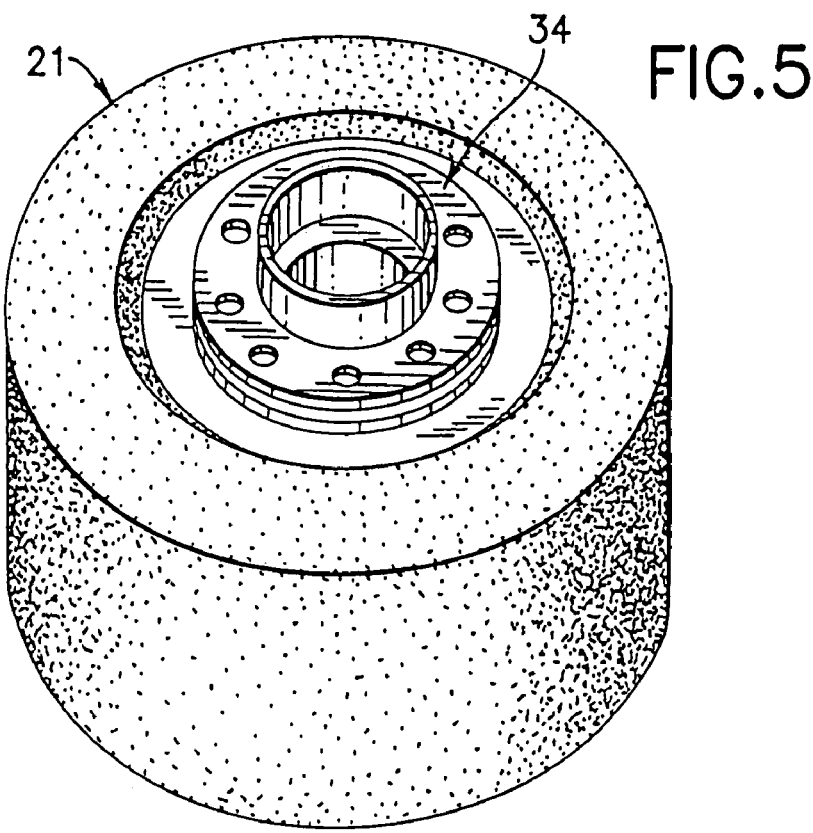
FIG. 5 is a bottom view showing a bypass valve in position.
Figure 6:
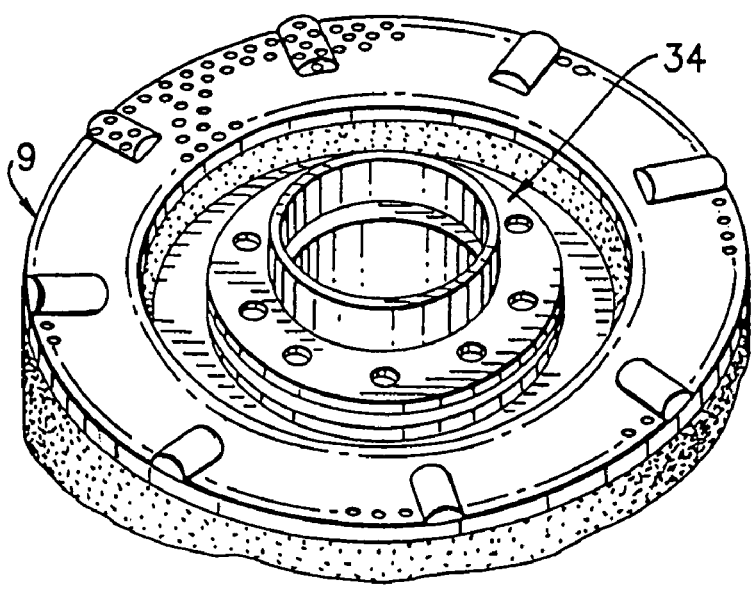
FIG. 6 is a bottom view showing in greater detail the oil inlet to the normal filter and the oil inlet to the micro-filter, including the bypass valve.
Figure 7:
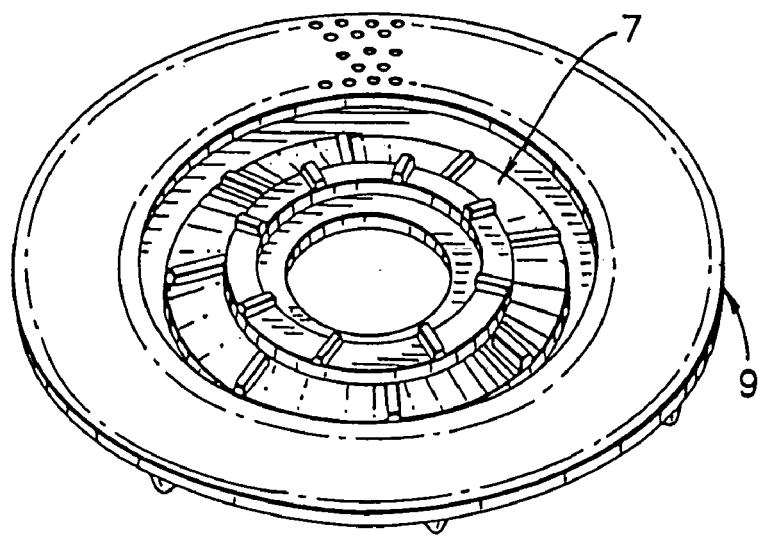
FIG. 7 is a top view of an oil holding valve or backflow valve and the surrounding inlet plate to the micro-filter insert.
Figure 8:
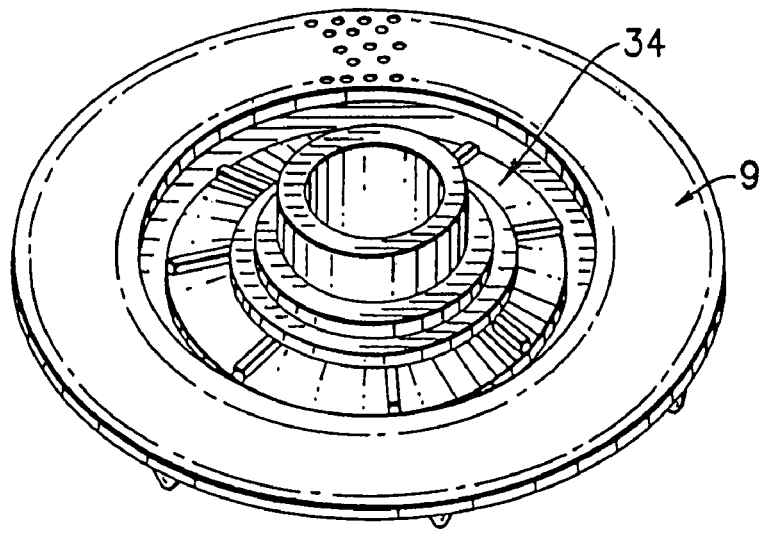
FIG. 8 is a top view of the oil holding valve and the surrounding inlet plate to the micro-filter insert, as well as the bypass valve positioned over the oil holding valve.
Figure 9:
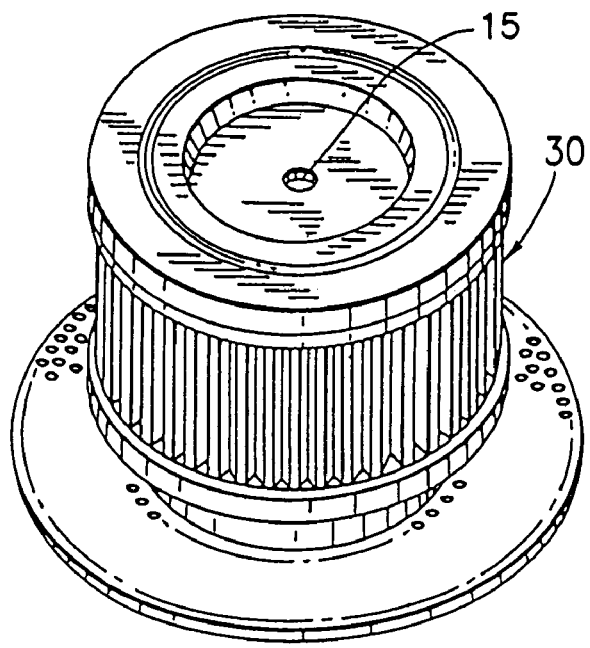
FIG. 9 is a top view depicting the normal oil filter element that contains an orifice providing fluid communication between the high pressure micro-filtering portion and the lower pressure normal filtering portion.
Figure 10:
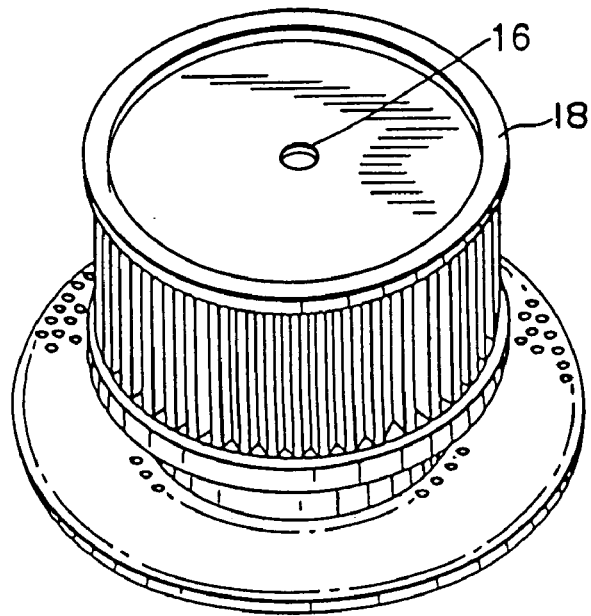
FIG. 10 shows a back pressure valve and seal between the normal filter, the inside of a micro-filter tube and an upper outlet/inlet plate.
Figure 11:
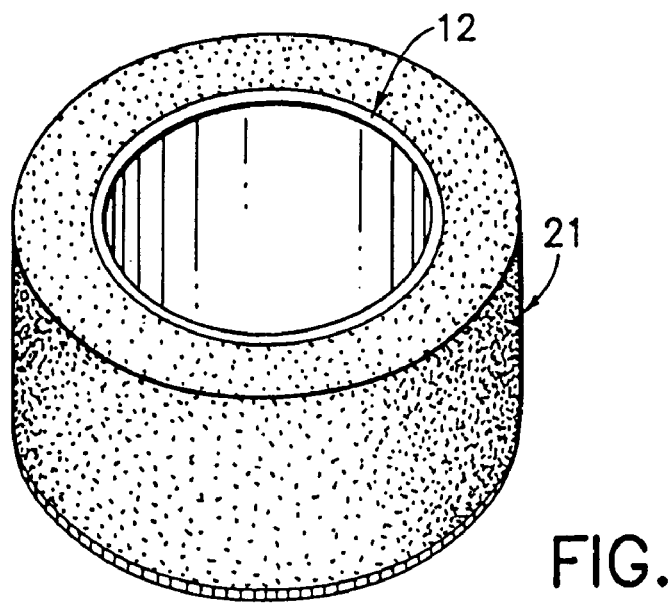
FIG. 11 is a top view of the outer micro-filter element.
Figure 12:
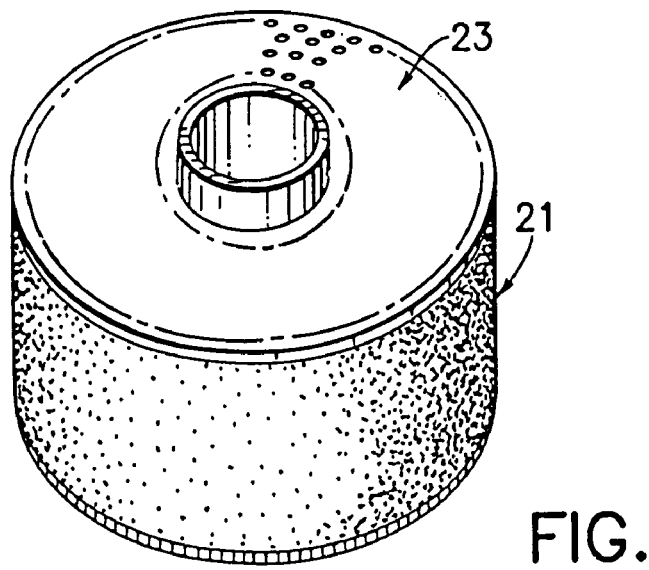
FIG. 12 is a top view of the outer micro-filter element having the upper outlet/inlet plate in position.

In further embodiments of this invention it can be appreciated that the overall length of the filter housing 11 could be reduced by a factor of about two by eliminating the second micro-fine filter element 22, and by making the length of the first micro-fine filter element 21 and the tube 12 about equal to the length of the normal filter element 30. This embodiment of the HOFA is depicted in a simplified form in FIG. 2B.

Figure 13:
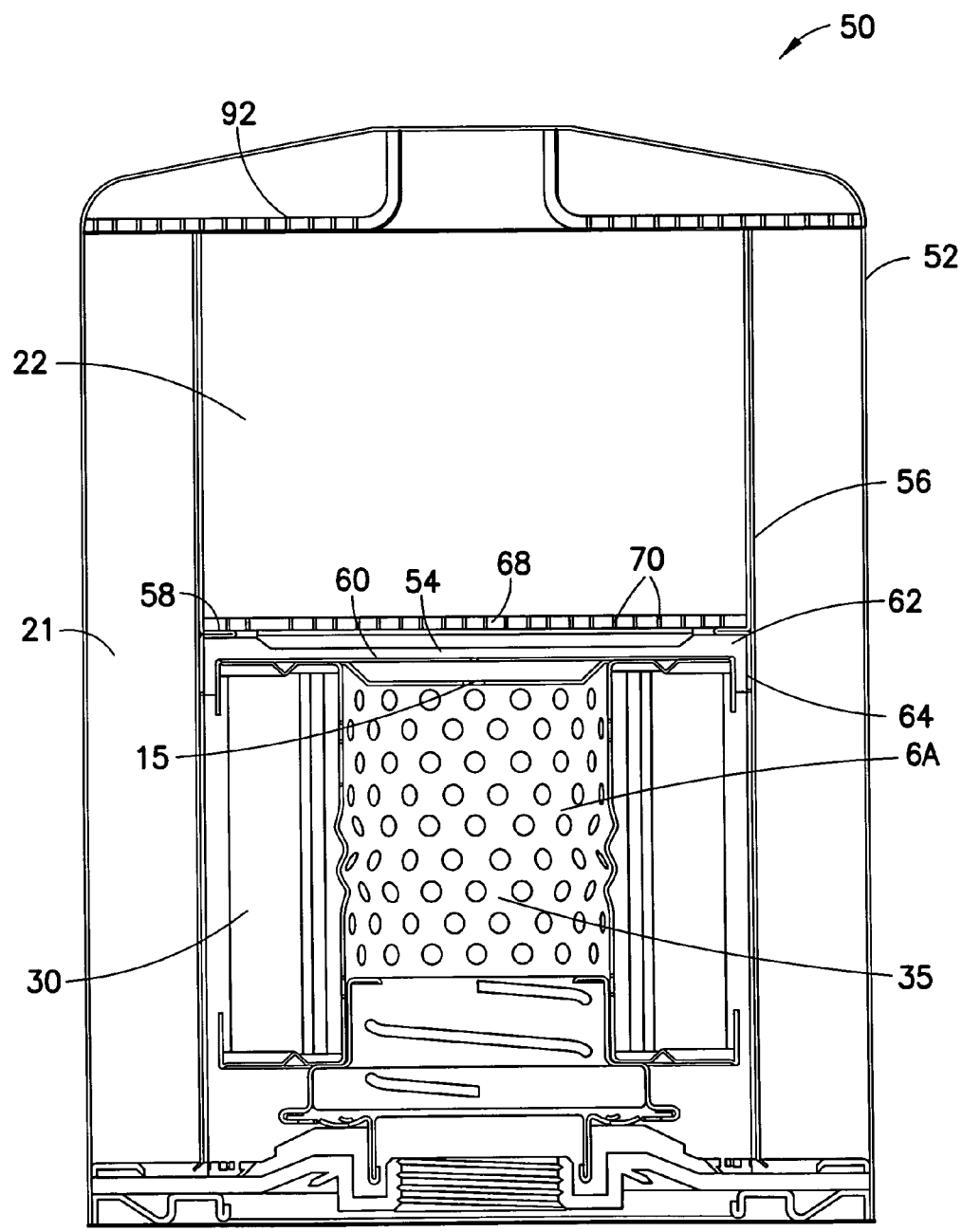
FIG. 13 is a schematic cross sectional view of an alternate embodiment of the filter assembly incorporating features of the invention.

Referring now to FIG. 13, an alternate embodiment of the filter assembly is shown. In this embodiment, the filter assembly 50 generally comprises a housing 52, the first filter element 30, the second filter element comprising the first and second filter members 21, 22, and a flutter valve 54. The housing 52 is identical to the housing in the first embodiment shown in FIG. 2 with the exception of the tube 12. The tube 56, which replaces the tube 12, has a general tubular shape and surrounds the first filter element 30 and the second member 22 of the second filter element. The tube 56 comprises an inwardly extending rim 58 formed by a fold in the tube 56. The rim 58 forms two opposite surfaces which the flutter valve 54 and an outlet plate 68 at the exit from the second flow path are positioned against.

Figure 14:
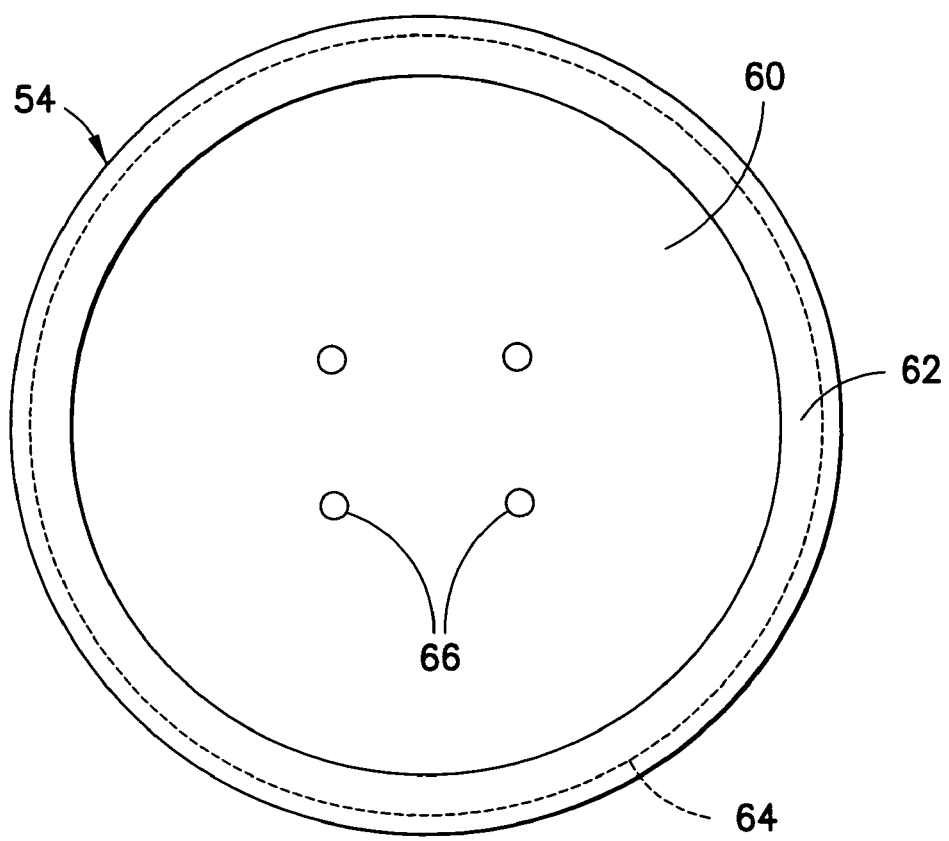
FIG. 14 is a top plan view of the flutter valve used in the filter assembly shown in FIG. 13.

Referring also to FIG. 14, a top plan view of the flutter valve 54 is shown. The flutter valve 54 is preferably comprised of Silicon or other flexible material, such as rubber for example, and is resiliently deflectable. The flutter valve 54 generally comprises a center section 60, an enlarged thickness outer portion 62, and a downwardly extending rim 64. The center section 60 comprises holes 66 therethrough. In the embodiment shown, the center section 60 comprises four holes 66. However, in alternate embodiments, the center section 60 could comprise more or less than the four holes. In addition, the holes could be arranged in any suitable array. However, in a preferred embodiment, the holes 66 are offset from the center of the flutter valve 54.

Similar to the plate 19 in the embodiment shown in FIG. 2, the filter assembly 50 comprises the plate 68 located at the bottom of the second member 22 of the second filter element. The plate 68 is supported on one side of the rim 58. The plate 68 comprises holes 70 which passed through the plate.

The first filter element 30 is provided as a unitary member with a supporting frame 72. The filter element 30 and supporting frame 72 can comprise a conventional subassembly as known in the art. The top of the supporting frame 72 comprises a recessed section which extends towards the void 6A in the open area 35. The top of the supporting frame 72 is substantially closed except for a center aperture 15. In the embodiment shown, the holes 66 of the flutter valve 54 are offset or not aligned with the center aperture 15. The holes 66 of the flutter valve 54 are also offset or not aligned with the holes 70 in the plate 68.

The outer portion 62 of the flutter valve 54 forms a seal between the top of the supporting frame 72 and the rim 58 of the tube 56. The rim 64 of the flutter valve 54 also extends down along the side of the supporting frame 72 and forms a seal therewith.

FIG. 13 shows the flutter valve at a home position. In the home position the center section 60 is spaced from the bottom surface of the plate 68 and is spaced from the recessed section of the top of the supporting frame 72 having the outlet orifice 15. The flutter valve 54 is maintained at this home position when there is no fluid pressure differential on opposite top and bottom sides of the flutter valve. This occurs when the engine is at rest, or when the engine is at a steady state of operation.

Figure 15:
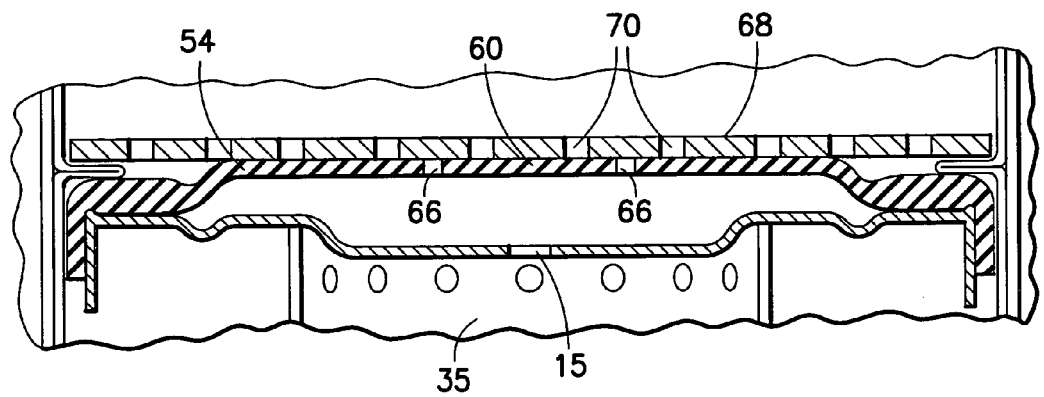
FIG. 15 is an enlarged partial cross sectional view of the filter assembly shown in FIG. 13 with the flutter valve moved to a first closed position.
Figure 16:
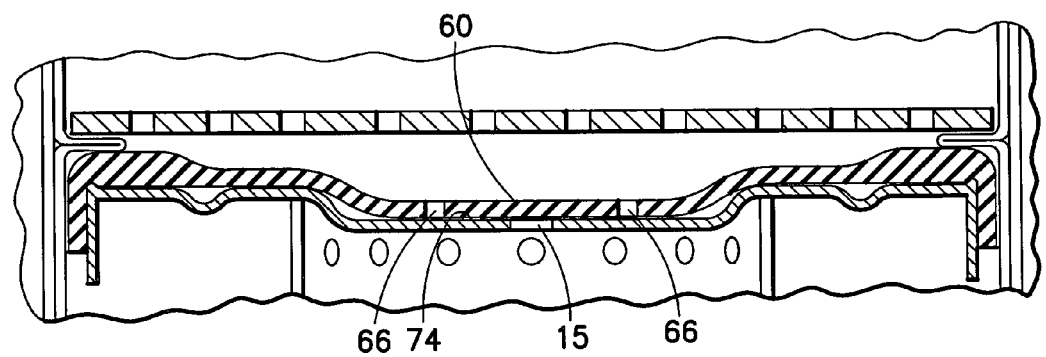
FIG. 16 is an enlarged partial cross sectional view as in FIG. 15 with the flutter valve moved to a second closed position.

Referring also to FIGS. 15 and 16, the flutter valve is shown at two other positions. In the position shown in FIG. 15, the flutter valve 54 has its center section 60 moved to an up position. In this up position, the top surface of the center section 60 contacts the bottom surface of the plate 68. Because the holes 66 in the center section 60 are not aligned with the holes 70 in the plate 68, the holes 66 become blocked by the plate 68. Thus, oil is prevented from flowing through the holes 66.

The position of the flutter valve 54 shown in FIG. 15 occurs when the engine is initially started and, during periods of engine acceleration. More specifically, when there is an increase in oil pressure at the holes 32, such as when starting the engine or during engine acceleration, oil pressure will increase in the open space 35 faster than oil pressure will increase at the outlet from the second filter element proximate the holes 70. This is because there is a time difference or time differential between the transmission of the increased pressure through the second filter element 21, 22 verses the transmission of the increased pressure through the first filter element 30. Because the holes 66 are offset from the orifice 15, the flow of oil upward through orifice 15 initially presses against a portion of the center section 60 which does not have the holes 66. Thus, this initial force moves the center section upward faster than if one of the holes 66 was located directly above the orifice 15.

The second filter element 21, 22, because of its finer filtering capability (smaller pore size), is slower to transmit the increased oil pressure therethrough. This time differential between pressure transmission through the two filters 21, 22 and 30, causes a pressure differential between the open space 35 and the exit from the second member 22 of the second filter element at holes 70. Thus, oil flows from the open space 35 through the orifice 15 in an upward direction towards the flutter valve 54.

Because the center section 60 of the flutter valve 54 is deflectable, as the oil passes through the orifice 15 it presses against the center of the center section 60 and pushes the center section 60 upward against the plate 68. This causes the holes 66 to be closed by the plate 68 and substantially prevents the oil from flowing through the holes 70 and into the second member 22 of the second filter element in a reverse direction. In other words, the flutter valve 54 functions as a check valve to prevent a flow of oil through the holes 70 in a reverse direction. Thus, the second filter element is substantially prevented from receiving oil which has been filtered by the first filter element 30 directly from the open space 35. This allows a greater percentage of oil to be filtered by the second filter element 21, 22 entering the holes 32 than would otherwise be provided if the flutter valve was not present.

When the oil pressure on opposite sides of the plate 68 approaches equalization, the center section 60 of the flutter valve 54 can return back to its home position shown in FIG. 13. This return is due to the flutter valve's own internal resiliency. Oil filtered by the second filter element 21, 22 can now flow through the holes 70, through the holes 66, and out the orifice 15 to be mixed with oil filtered by the first filter element 30 in the open space 35.

FIG. 16 shows the center section 60 of the flutter valve 54 in a down position. In this down position the bottom surface of the center section 60 is located against the top surface 74 of the recessed section of the supporting frame 72. Because the holes 66 in the center section 60 are not aligned with the hole 15 in the supporting frame 72, the holes 66 become blocked by the plate top surface 74. Thus, oil is prevented from flowing through the holes 66 and hole 15.

The position of the flutter valve 54 shown in FIG. 16 occurs is during periods of engine deceleration. More specifically, when there is a decrease in oil pressure at the holes 32, oil pressure will decrease in the open space 35 faster than oil pressure will decrease at the outlet from the second filter element proximate the holes 70. This is because there is a time differential between the transmission of the decreased pressure through the second filter element 21, 22 verses the transmission of the decreased pressure through the first filter element 30. The second filter element 21, 22, because of its finer filtering capability, is slower to transmit the decreased oil pressure therethrough. This causes a pressure differential between the open space 35 and the exit from the second member 22 of the second filter element. Thus, oil flows through holes 70 faster that oil flows out of the open space 35.

Because the center section 60 of the flutter valve 54 is deflectable, as the oil passes through the holes 70 it presses against the center section 60 and pushes the center section 60 downward against the top surface 74. This causes the holes 66 to be closed by the top surface 74 and prevents the oil from flowing through the hole 15 and into the open area 35. In other words, the flutter valve 54 functions as a speed control valve or pressure differential control valve to prevent a flow of oil through the holes 70 too fast. Thus, the second filter element is substantially prevented from decreasing the pressure of oil in the second filter element too fast. This allows slower pressure fluctuations in the second filter element than would otherwise be provided if the flutter valve was not present and, faster resumption of filtering by the second filter element after the engine accelerates again or obtains a steady state. The first filter element 30 is always working during operation of the engine regardless of whether or not a path through the second filter element 21, 22 is open or closed by the flutter valve.

When the oil pressure on opposite sides of the center section 60 of the flutter valve 54 approaches equalization, the center section 60 of the flutter valve 54 can return back to its home position shown in FIG. 13. This return is due to the flutter valve's own internal resiliency. Oil filtered by the second filter element 21, 22 can now flow through the holes 70, through the holes 66, and out the orifice 15 to be mixed with oil filtered by the first filter element 30 in the open space 35. In an alternate embodiment, the supporting frame 72 could have more than one orifice 15 and, one or more of the orifice(s) could be aligned with one or more of the holes 66, such as when the holes 66 are smaller than the orifice(s).

Figure 17:
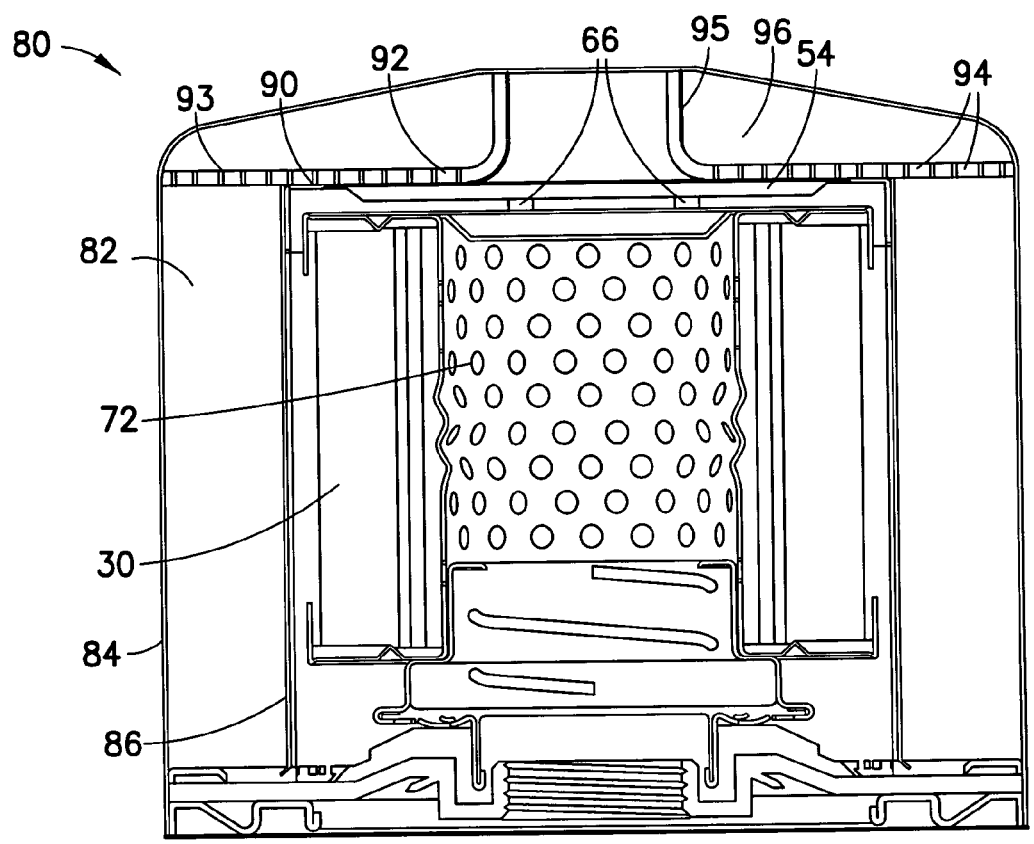
FIG. 17 is a schematic cross sectional view of another alternate embodiment of the filter assembly of the invention.

Referring now also to FIG. 17, another alternate embodiment of the present invention is shown. The filter assembly 80 has a smaller height than the filter assembly 50 shown in FIG. 13. The filter assembly 80 does not comprise the second member 22 of the second filter element. In addition, the first filter element 82 has a smaller height then the first member 21 of the second filter element shown in FIG. 13.

In this embodiment, the filter assembly 80 generally comprises the first filter element 30 the supporting frame 72, a second filter element 82 and a housing 84. The housing 84 includes a tube 86 which surrounds the first filter element 30 and the supporting frame 72. A top of the tube 86 comprises a lip 90. The flutter valve 54 is sandwiched between the top of the supporting frame 72 and the bottom surface of the lip 90.

The housing 84 includes a member 92. The housing member 92 comprises a plate section 93 and a spacer section 95. The plate section 93 comprises holes 94 through the housing member. The holes 94 allow oil to pass through the top of the second filter element 82 into a space 96 and through the holes 94 towards the top side of the flutter valve 54.

The flutter valve 54 for the embodiment shown engine FIG. 17 functions in the same way as the flutter valve described with reference to FIGS. 13-16. The housing member 92 is the same as the housing member 92 used in the embodiment shown in FIG. 13. In addition, the first filter element 30 and supporting frame 72 are the same as those used in the embodiment shown in FIG. 13. Thus, the alternate embodiment of FIG. 17 illustrates that components, such as the housing member 92, first filter element 30, and supporting frame 72, can be used in different embodiments.

In accordance with one aspect of the present invention, a hybrid oil filter assembly is provided comprising a housing forming a first oil flow path and a second oil flow path; a first oil filter element 30 for filtering particles having a first minimum size, the first oil filter element being located in the first oil flow path; and a second oil filter element 21, 22 that surrounds the first oil filter element 30 along a portion of the length thereof, the second oil filter element 21, 22 being located in the second oil flow path for filtering particles having a second minimum particle size that is smaller than the first minimum particle size. Oil in the first oil flow path that has been filtered by the first oil filter element 30 and oil in the second oil flow path that has been filtered by the second oil filter element 21, 22, but not filtered by the first filter 30, first begin to mix together within a void 6A contained within the first oil filter element 30 before being discharged from the hybrid oil filter assembly.

In accordance with another aspect of the invention, a liquid filter assembly is provided comprising a first liquid filter element 30; a second liquid filter element 21,22; and a housing having the first and second liquid filter elements therein, and a plate 23 located along a top side of the second filter element and proximate a top of the housing, the plate having holes 24 therethrough; a threaded motor engaging assembly connected to a bottom of the housing. The housing and filter elements form a plurality of partially separate liquid flow paths or path segments through a filter. The first filter element 30 is located in a first one of the flow paths. The second filter element 21, 22 is located in a second one of the flow paths. A portion 21 of the second filter element surrounds a portion of the first filter element 30. The second filter element 21, 22 comprises a top side surface along a bottom side of the plate 23 which forms a filtered liquid exit from the portion 21 of the second filter element through the holes in the plate.

In accordance with another aspect of the invention, a liquid filter assembly is provided comprising a first liquid filter element 30; a second liquid filter element 21, 22; and a housing having the first and second liquid filter elements therein. The housing and filter elements form at least partially separate liquid flow paths. The first filter element is located in a first one of the flow paths. The second filter element is located in a second one of the flow paths. At least a portion 21 of second filter element surrounds at least a portion of the first filter element 30. The first and second liquid flow paths begin to merge in an open space 35 at a center of the first liquid filter element 30.

In accordance with another aspect of the invention, a liquid filter assembly is provided comprising a first liquid filter element 30 adapted to filter particles larger than a first size; a second different liquid filter element 21, 22 adapted to filter particles larger than a second size, the second size being smaller than the first size; and a housing having the first and second liquid filter elements therein, the housing forming a first liquid flow path having the first liquid filter element therein, and a second liquid flow path having the second liquid filter element therein. The first and second liquid flow paths share a common inlet pressure of liquid entering into the housing. Liquid from an outlet of the first liquid flow path and liquid from an outlet of the second liquid flow path combine at a mixing area 35, wherein the filter assembly comprises a liquid flow path restriction orifice 15 proximate the outlet of the second liquid flow path such that liquid pressure at the orifice 15 proximate the outlet of the second liquid flow path is larger relative to liquid pressure at the outlet of the first liquid flow path into the mixing area 35. The first and second liquid flow paths begin to merge in the open 35 space in a center of the first filter element 30.

Figure 18:
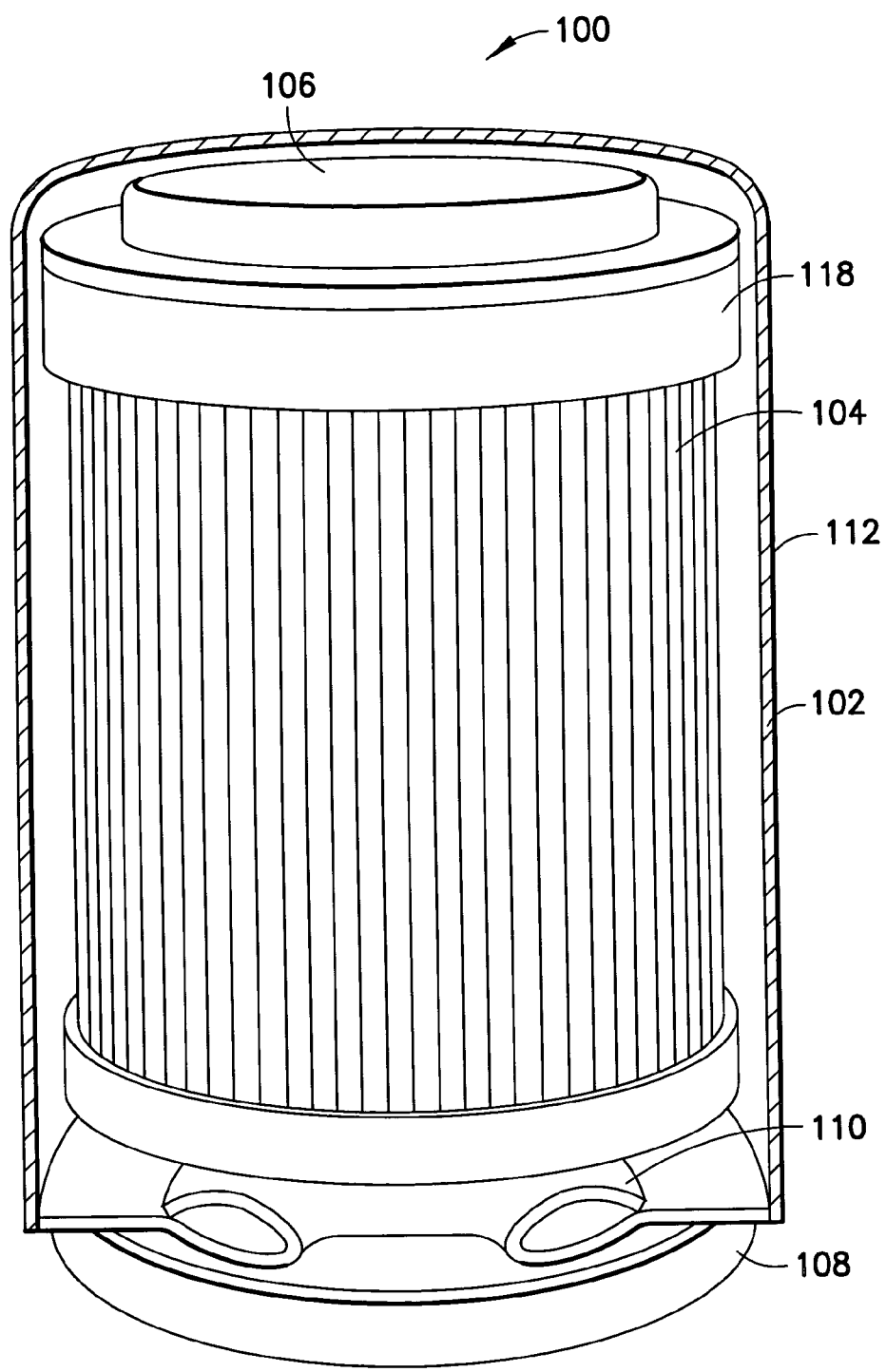
FIG. 18 is a cut-away side view of an alternate embodiment of a filter assembly incorporating features of the invention.

Referring now to FIG. 18 a cut-away side view of a filter assembly 100 is shown. The filter assembly 100 is preferably a vehicle oil filter. However, features of the invention could be used in other embodiments. The filter assembly 100 generally comprises a housing 102 and two filter elements 104, 106. The housing 102 is substantially similar to conventional vehicle oil filters with a base plate 108 adapted to be screwed onto a fitting of a motor, a valve 110 at the base plate, and a exterior cover 112 attached to the base plate 108 and enclosing the two filter elements 104, 106.

Figure 19:
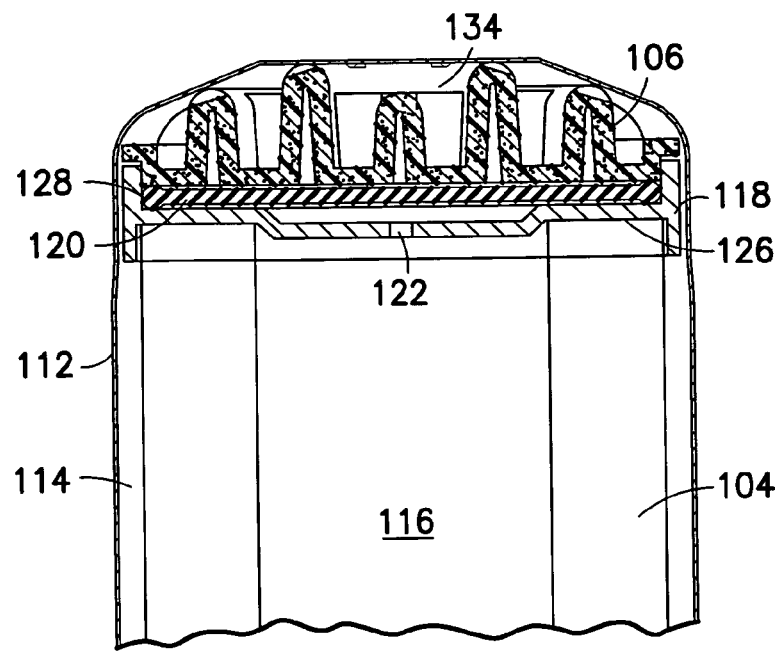
FIG. 19 is a partial cross sectional view of the filter assembly shown in FIG. 18.
Figure 20:
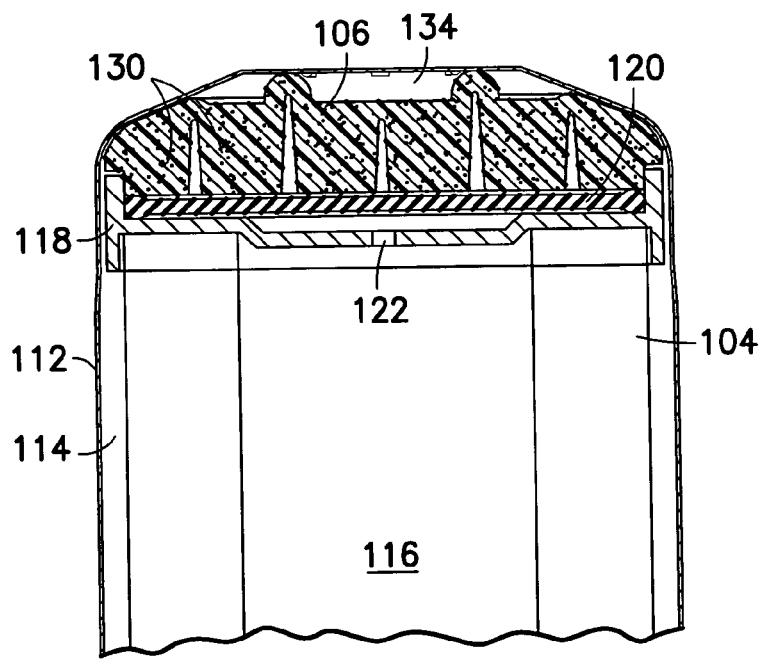
FIG. 20 is a partial cross sectional view of the filter assembly shown in FIG. 18.

The housing 102 is substantially the same as a conventional oil filter, such as a NAPA or MOBIL oil filter. The first filter element 104 is substantially the same as the filter elements used in conventional oil filters, but is slightly shorter in height to fit with the other components of the filter assembly inside the height of the exterior cover 112. However, in alternate embodiments, the exterior cover could have any suitable height and the first filter element could be comprised of any suitable filter material. Referring also to FIGS. 19 and 20, in a preferred embodiment the first filter element 104 is a conventional pleated paper or fiberous composite having a general ring shape which is adapted to filter particles above about 40-10 microns in size. Incoming oil can flow from an inlet in the base plate 108 into an area 114 between the exterior cover 112 and the outer perimeter side of the first filter element 104 to enter the first filter element and exit the first filter element into a central cavity 116 of the ring shape and out a central bottom outlet of the base plate 108.

Figure 21:
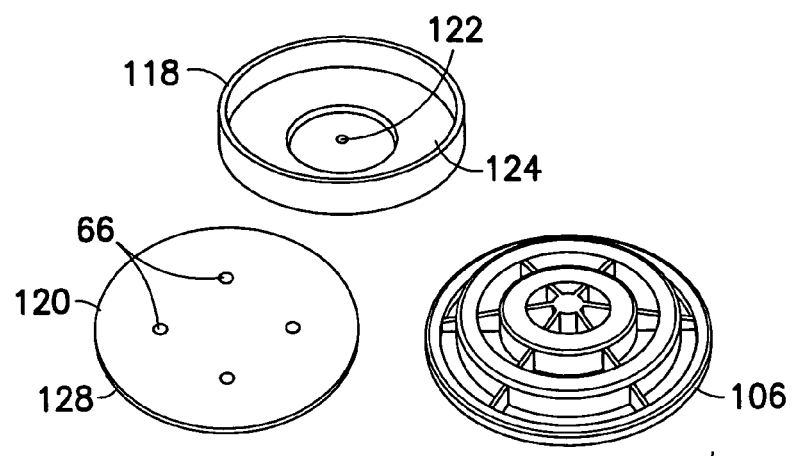
FIG. 21 is an exploded perspective view of three of the components of the filter assembly shown in FIG. 18.
Figure 22:
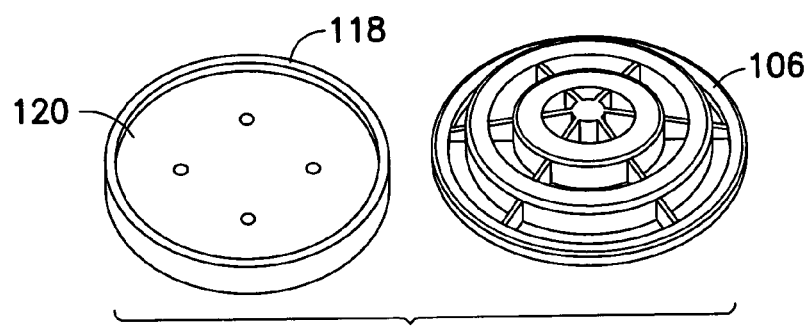
FIG. 22 is an exploded perspective view of the components shown in FIG. 21 showing the flutter valve member mounted on the cover plate.
Figure 23:
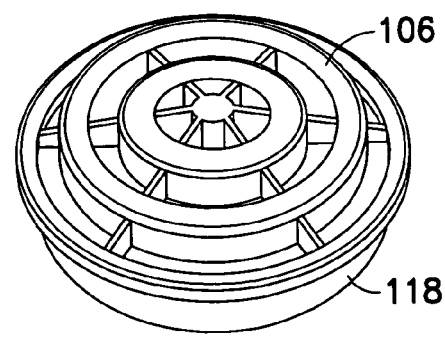
FIG. 23 is an exploded perspective view of the components shown in FIG. 21 showing the micro filter member mounted on the cover plate.

The filter assembly includes a cover plate 118, a flutter valve member 120 and the second filter element 106 located on top of the first filter element 104. Referring also to FIGS. 21-23, the cover plate 118 comprises a hole 122, and top and bottom receiving areas 124, 126. The bottom receiving area 126 is adapted to receive the top of the first filter element 104 as seen in FIG. 19. The flutter valve member 120 is comprised of resilient flexible rubber or polymer material and, its center section is adapted to move up and down similar to the valve described in FIG. 13-16 based upon fluid pressure variations. The flutter valve member 120 has four holes 66. However, any suitable number, shape and size of holes could be provided. The flutter valve member 120 functions substantially the same as the flutter valve 54 described above. The hole 122 can be opened and closed as the flutter valve member 120 moves up and down. Likewise, the holes 66 in the flutter valve member can be closed as the valve moves up and down.

The flutter valve member 120 is sized and shaped to be received in the top receiving area 124 and comprises an enlarged outer rim 128 which functions as an O-ring seal when the second filter element 104 presses against the rim 128 when assembled with the housing 102. Thus, the flutter valve member comprises an integral O-ring seal. The outer perimeter of the cover member 118 is spaced from the interior side of the cover 112 to allow fluid to flow up into the area 134 above the second filter element 106.

The bottom of the second filter element 106 is inserted into the top receiving area 124 of the cover plate 118. The second filter element 106 is preferably comprised of a molded or formed porous plastic or polymer material. Molded or formed porous plastic or polymer filter members have been used in the medical industry, such as Mupor™ porous PTFE sold by Porex Corporation of Fairburn, Ga. Mupor™ porous PTFE can have a pass size as small as 5 micron or less for example, and can have a thickness as small as only 2 mm or less for example. In alternate embodiments the thickness of the second filter element 106 could be any suitable thickness (more or less than 2 mm) and could comprise a varying thickness at different locations. Porex Corporation also manufactures porous plastic members made of other polymer materials, such as PE, PP, PDVF, EVA, NYLON 6, TPU, and SCP. Any suitable polyamide could be used to form a porous plastic member.

The second filter element 106 preferably has a pass size or pore size of about 4-5 microns. A filter element with a pore size of about 1-2 microns could be used, but would need to be very large and, thus, may not be suitable for a smaller size embodiment such as a vehicle oil filter package. Because the second filter element 106 is comprised of a molded or formed porous plastic or polymer material it can be used as a structural member to press against the top side of the flutter valve member 120 at the rim 128 to thereby seal the junction of the second filter element with the cover member at the rim and prevent inadvertent bypass of fluid at the junction without going through the second filter element. The nature of providing the second filter element with molded porous plastic material allows the second filter element to be smaller than otherwise available and have a smaller pore size than would otherwise be available with a paper or fiberous composite filter element. Because the second filter element can also be used in a structural manner, an extra member, such as the outlet plate 68 shown in the embodiment of FIG. 15 need not be provided.

Figure 24:
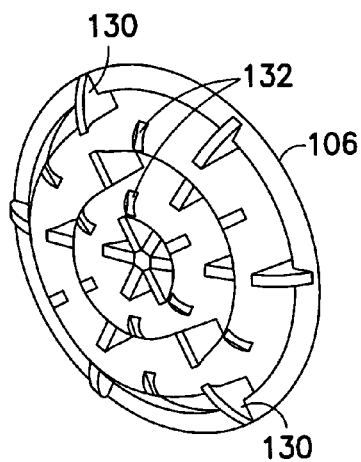
FIG. 24 is a perspective view of the micro filter member shown in FIG. 18.
Figure 25:
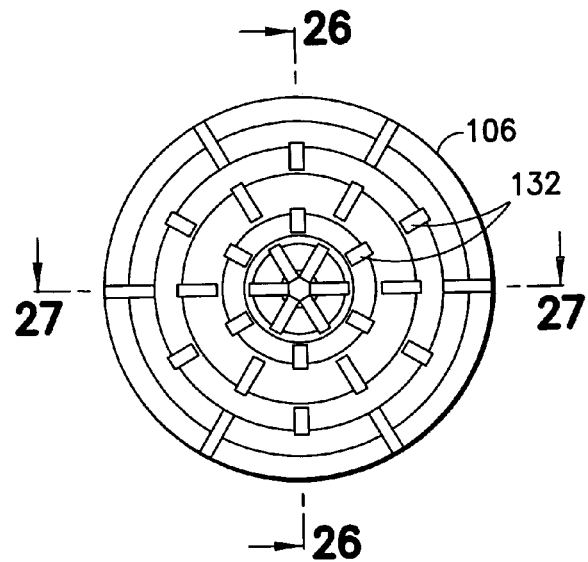
FIG. 25 is a top plan view of the micro filter member shown in FIG. 24.
Figure 26:
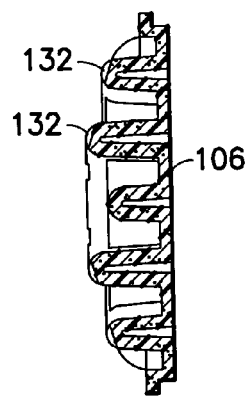
FIG. 26 is a cross sectional view of the micro filter member shown in FIG. 25 taken along line 26-26.
Figure 27:
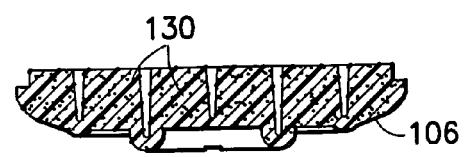
FIG. 27 is a cross sectional view of the micro filter member shown in FIG. 25 taken along line 27-27.

Referring now also to FIGS. 24-27 an embodiment of the second filter element is shown. In alternate embodiments, the second filter element could comprise any suitable size or shape. The second filter element 106 generally comprises a wave shaped cross section as seen best in FIGS. 19 and 26, but with stiffening ribs 130 as seen in FIGS. 20, 24 and 27. The wave shaped cross section provides an increase surface area for the fluid to pass through the second filter element 106. Upper sides of the wave shape are adapted to be contacted by the exterior cover 112 of the housing and pressed inward towards the cover plate 118. The upper sides of the wave shape also comprise channels 132 to allow fluid to flow between the top sides of the wave shapes and the interior side of the exterior cover 112.

With the invention there is no need to provide an additional separate spring to bias the first filter element towards the base plate. The cover 112 and subassembly 118, 120 and 106 can provide this biasing action. About 5%-10% of the fluid flowing through the filter assembly will flow through the micro filter 106 and about 95%-90% of the fluid will flow through the first filter element 104. In tests of motor oil flow through a micro filter 68 mm round and 2 mm thick with a 10 micron pore size, the following test results were achieved for oil at 800 F. to obtain 100 ml of flow:

| Pressure (approximate) | Time (approximate) |
|---|---|
| 15 psi | 6 minutes |
| 20 psi | 4.5 minutes |
| 35 psi | 55 seconds |
| 60 psi | 25 seconds |

With a 5 micron pore size, at 45 psi, about 12 liters per hour can pass through the micro filter.

In an alternate embodiment the flutter valve member might not be provided. With the invention there is more tolerance during assembly than would otherwise be available unless a separate spring was added. A separate spring would increase the cost of the filter assembly and increase the height of the filter assembly. In an alternate embodiment, the second filter element could comprise two or more members or section having different pore sizes, such as one section having a pore size of 6 microns and another section having a pore size of 4 microns. In an alternate embodiment one or more of the sections could have pore sizes greater or less than 4-6 microns. The one or more of the sections could be molded or overmolded with another one of the sections, or could be merely connected to each other. The sections or layers could be comprised of different polymer materials. The invention could also be used in a hydraulic system filter and is not limited to a vehicle oil filter.

Figure 28:
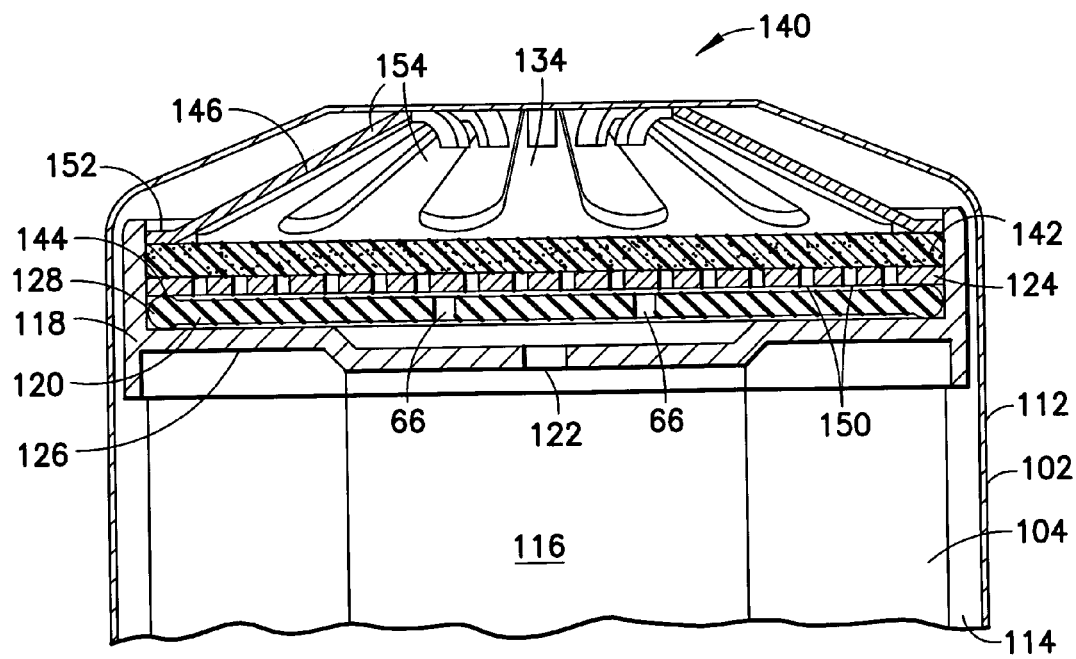
FIG. 28 is a partial cross sectional view of an alternate embodiment of a filter assembly.

Referring now to FIG. 28, a partial cross sectional view of an alternate embodiment of the invention is shown. The filter assembly 140 is preferably a vehicle oil filter. However, features of the invention could be used in other embodiments. The filter assembly 140 generally comprises a housing 102 and two filter elements 104, 142. The housing 102 is substantially similar to conventional vehicle oil filters with a base plate adapted to be screwed onto a fitting of a motor, a valve at the base plate, and a exterior cover 112 attached to the base plate and enclosing the two filter elements 104, 142.

Figure 29:
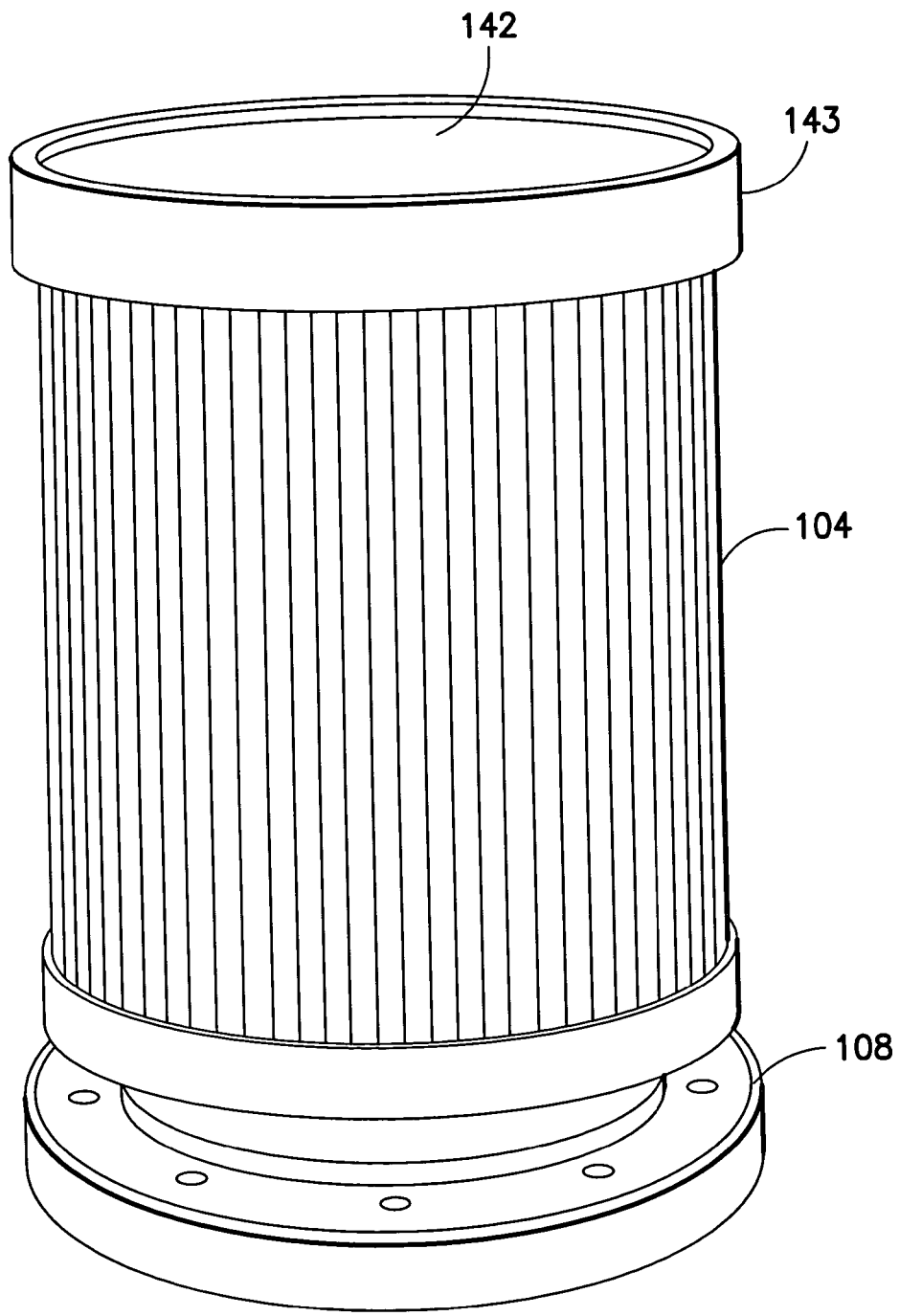
FIG. 29 is a perspective view showing the filter assembly of FIG. 28 without the spring or outer housing.

The housing 102 is substantially the same as a conventional oil filter, such as a NAPA or MOBIL oil filter. The first filter element 104 is substantially the same as the filter elements used in conventional oil filters, but is slightly shorter in height to fit with the other components of the filter assembly inside the height of the exterior cover 112. However, in alternate embodiments, the exterior cover could have any suitable height and the first filter element could be comprised of any suitable filter material. Referring also to FIG. 29, which shows the filter assembly with the exterior cover 112 and a spring 146 removed, in a preferred embodiment the first filter element 104 is a conventional pleated paper or fiberous composite having a general ring shape which is adapted to filter particles above about 40-10 microns in size. Incoming oil can flow from an inlet in the base plate 108 into an area 114 between the exterior cover 112 and the outer perimeter side of the first filter element 104 to enter the first filter element and exit the first filter element into a central cavity 116 of the ring shape and out a central bottom outlet of the base plate 108.

The filter assembly includes a cover plate 118, a flutter valve member 120, the second filter element 142, a support plate 144, and a spring 146, which are generally located above the first filter element 104. Referring also to FIGS. 30-33, the support plate 144 comprises holes 150. The bottom receiving area 126 of the cover member 118 is adapted to receive the top of the first filter element 104 as seen in FIG. 28. The flutter valve member 120 is comprised of resilient flexible rubber or polymer material and, its center section is adapted to move up and down similar to the valve described in FIG. 13-16 based upon fluid pressure variations. The flutter valve member 120 has holes 66. The flutter valve member 120 functions substantially the same as the flutter valve 54 described above. The hole 122 in the cover member 118 can be opened and closed by the flutter valve member 120 as the flutter valve member 120 moves up and down. Likewise, the holes 66 in the flutter valve member can be closed as the valve moves up and down by the cover member 118 and the plate 144.

The flutter valve member 120 is sized and shaped to be received in the top receiving area 124 of the cover member 118 and comprises an enlarged outer rim 128 which functions as an O-ring seal when the support plate 144 presses against the rim 128 when assembled with the housing 102. Thus, the flutter valve member comprises an integral O-ring seal. The outer perimeter of the cover member 118 is spaced from the interior side of the cover 112 to allow fluid to flow up into the area 134 above the second filter element 142.

Figure 30:
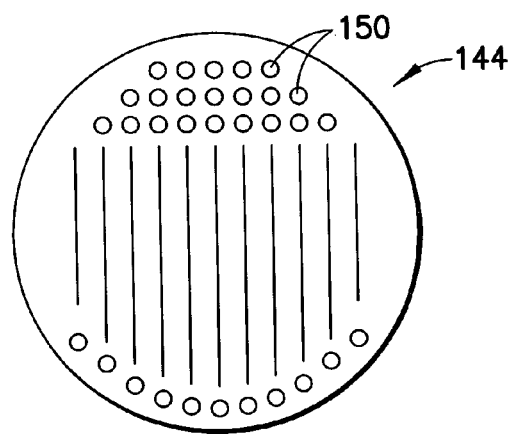
FIG. 30 is a top plan view of the plate located above the flutter valve shown in FIG. 28.

As seen in FIG. 30, the support plate 144 has the holes 150. The support plate 144 is located above the flutter valve member 120. Oil can flow through the holes 150 from the second filter element 142 (from the area 134) into the area above the flutter valve member 120 (unless the holes 150 are closed by the flutter valve member 120.

The second filter element 142 is inserted into the top receiving area 124 of the cover plate 118 above the support plate 144. The second filter element 142 is preferably comprised of a molded or formed porous plastic or polymer material. Molded or formed porous plastic or polymer filter members have been used in the medical industry, such as Mupor™ porous PTFE sold by Porex Corporation of Fairburn, Ga. Mupor™ porous PTFE can have a 5 micron pass size and can have a thickness of only 2 mm. In alternate embodiments the thickness of the second filter element 106 could be any suitable thickness (more or less than 2 mm) and could comprise a varying thickness at different locations. Porex Corporation also manufactures porous plastic members made of other polymer materials, such as Polyvinylidene Fluoride (PVDF), PE, PP, PDVF, EVA, NYLON 6, TPU, and SCP. Any suitable polyamide could be used to form a porous plastic member. The second filter element 142 could comprise an extruded member cut to height or a molded member for example.

Figure 31:
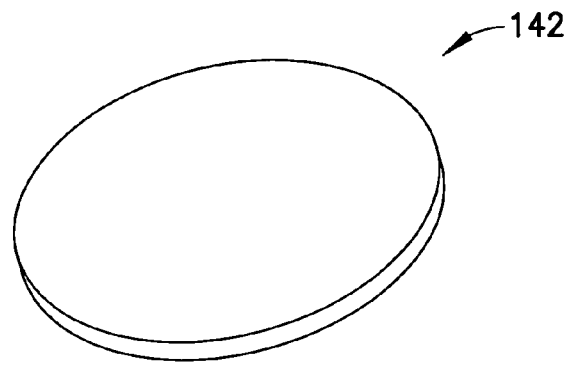
FIG. 31 is a perspective view of the disk shaped micro-filter element shown in FIG. 28.

As seen in FIG. 31, the second filter element in this embodiment has a general disk shape. The second filter element can be easily cut or stamped from a flat sheet of material. The material used to form the second filter element does not need a rigid shape because of the support structure for the second filter element. The second filter element 142 preferably has a pass size or pore size of about 4-5 microns. A filter element with a pore size of about 1-2 microns could be used, but would need to be very large and, thus, may not be suitable for a smaller size embodiment such as in FIG. 28. The nature of providing the second filter element with molded porous plastic material allows the second filter element to be smaller than otherwise available and have a smaller pore size than would otherwise be available with a paper or fiberous composite filter element.

Figure 32:
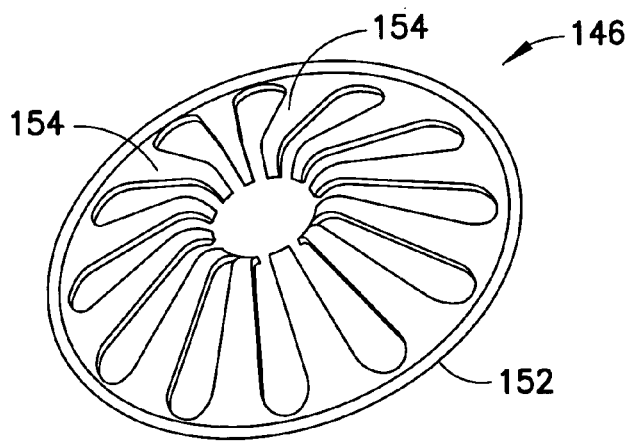
FIG. 32 is a perspective view of the spring shown in FIG. 28.
Figure 33:
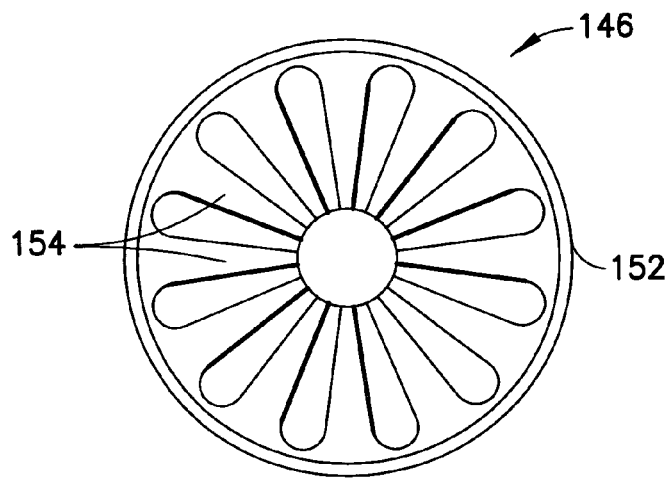
FIG. 33 is a top plan view of the spring shown in FIG. 32.
Figure 34:
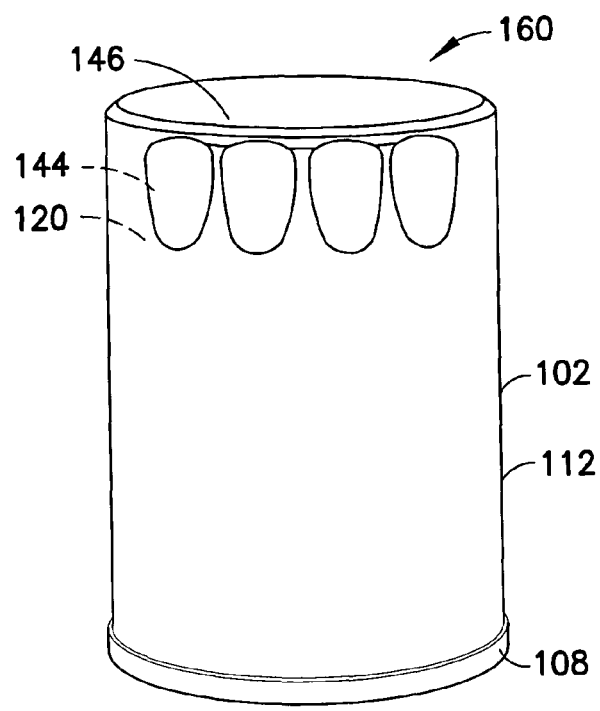
FIG. 34 is a perspective view of an alternate embodiment of the invention.
Figure 35:
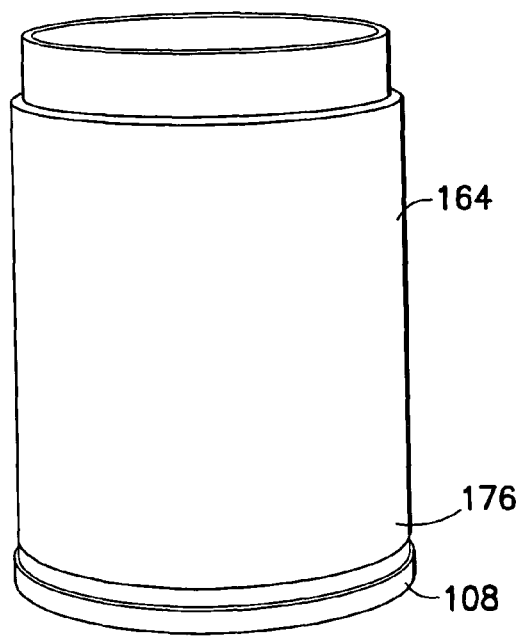
FIG. 35 is a perspective view of the filter assembly shown in FIG. 34 with the outer housing removed.

The spring 146 is used to provide a biasing action from the top of the cover 112. The spring could be comprised of any suitable material, such as bronze, steel or high temperature plastic for example. The spring 146 is able to press the components 144, 142, 128, 118 and 104 in a downward direction towards the base plate 108. As seen in FIGS. 32 and 33, in this embodiment the spring 146 comprises a one-piece member with a perimeter section 152 and spring leafs 154. The leafs 154 extend inward from the perimeter section 152 in a general cantilever fashion. Tops of the leafs 154 can press against the inside surface of the top of the cover 112. The perimeter section 152 can press the second filter element 142 against the support plate 144. The material of the second filter element can be slightly soft. Pressing of the seal against the top of the second filter element at its perimeter can form a seal at the perimeter of the second filter element with the support plate. This type of spring can occupy minimal vertical height, and can nonetheless provide a range taking capability. More specifically, the spring 146 allows variations in the height of the other components 104, 118, 120, 144, 142 and automatically adjusts. This can accommodate different height components for different models of filters or manufacturing tolerances. In alternate embodiments, any suitable type of spring(s) could be used.

Referring now to FIGS. 34-38 another alternate embodiment of the invention will be described. In this embodiment the filter assembly 160 generally comprises a housing 102, a first filter element 104, a second filter element 164, a flutter valve member 120, a support plate 144 and a spring 146. The flutter valve member 120, support plate 144 and spring 146 are arranged the same as that shown in FIG. 28, but the perimeter section of the spring is located directly on the support plate 144. The assembly 160 does not comprise the cover member 118. The structural features provided by the cover member 118 are, instead, provided by the second filter element 164 as further described below. The housing 102 includes the base plate 108 and the exterior cover 112. An inlet valve is located at the base plate 108.

Figure 36:
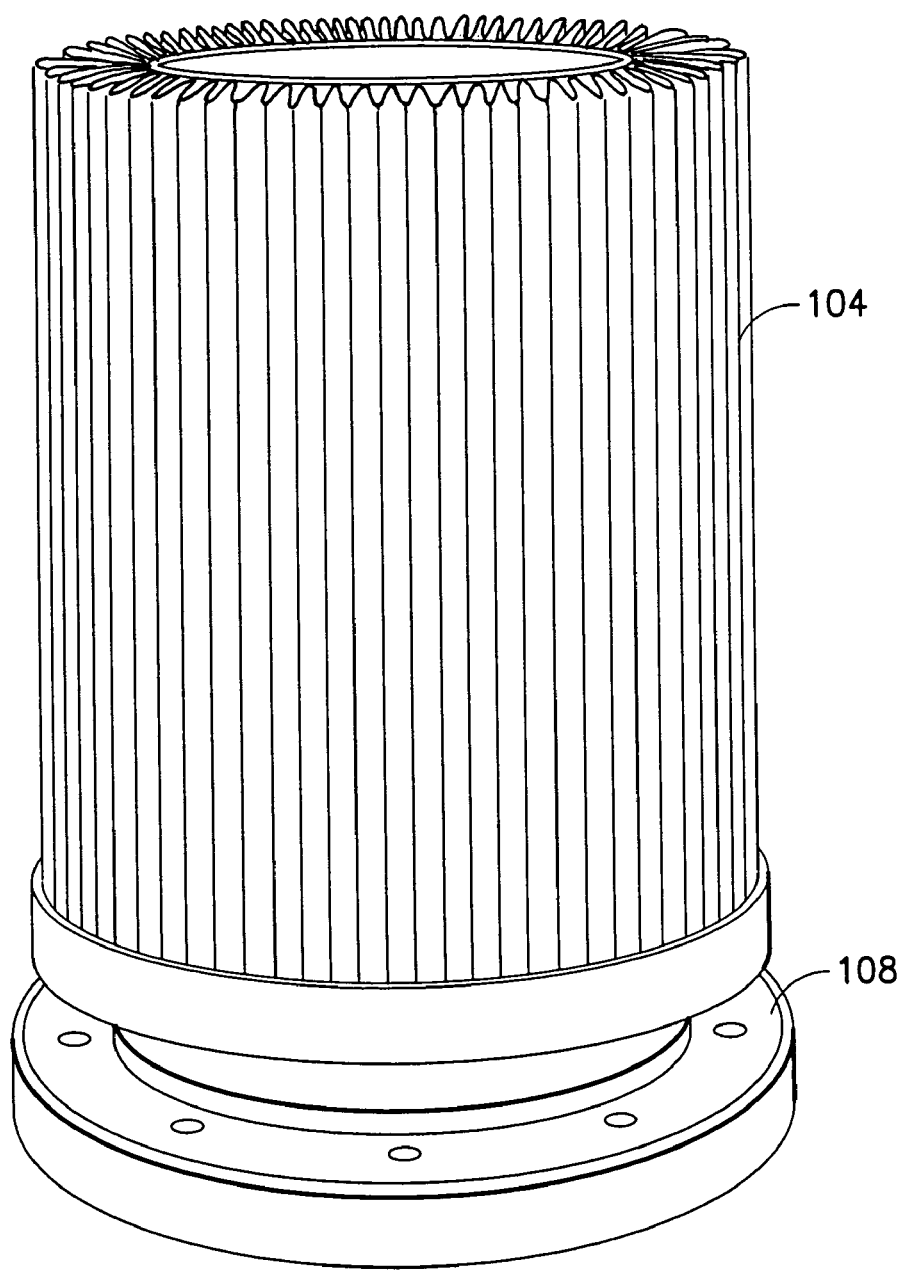
FIG. 36 is a perspective view of the filter assembly as shown in FIG. 35 with the outer micro-filter element removed.
Figure 37:
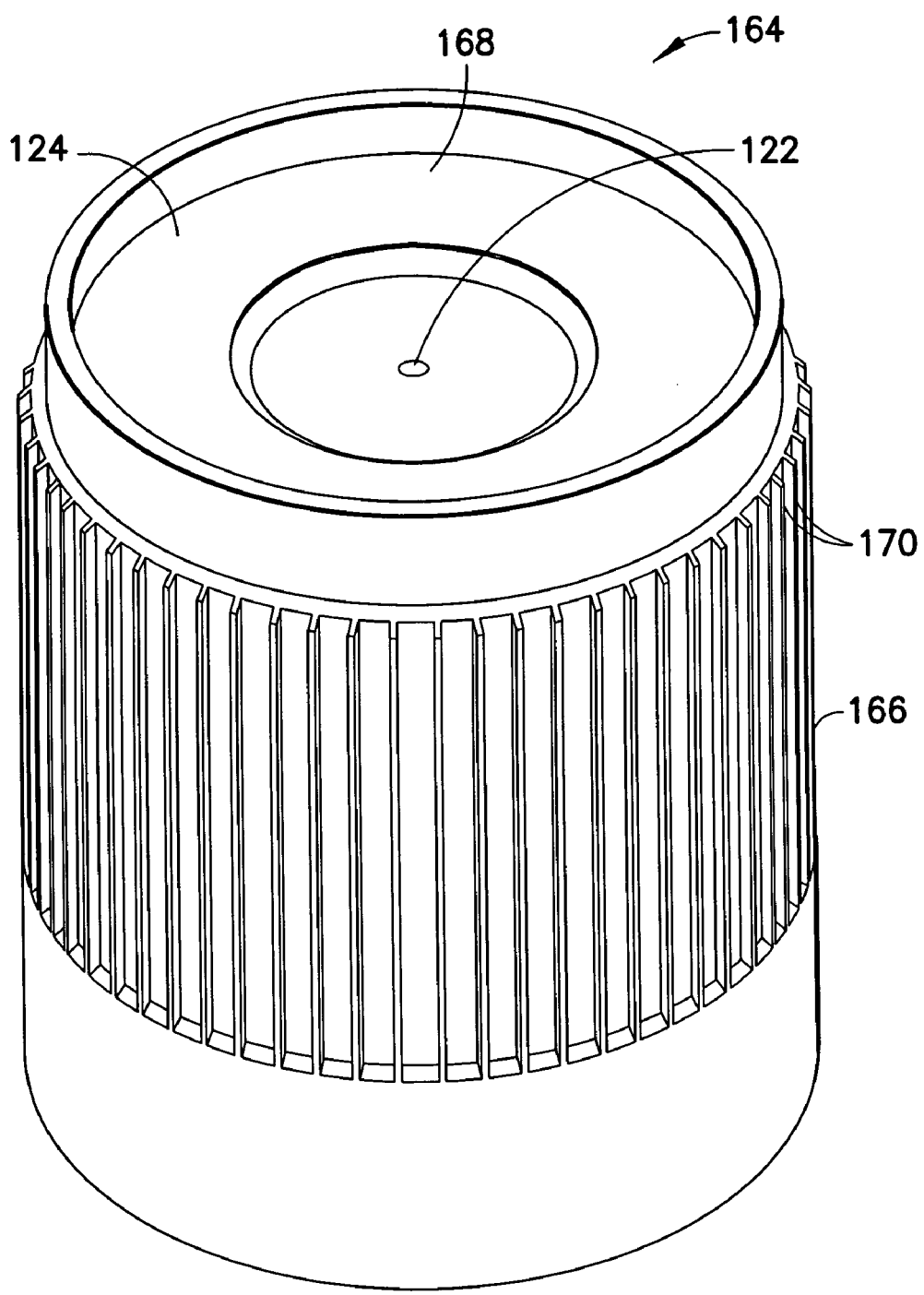
FIG. 37 is a perspective view of the outer micro-filter element shown in FIG. 35.
Figure 38:
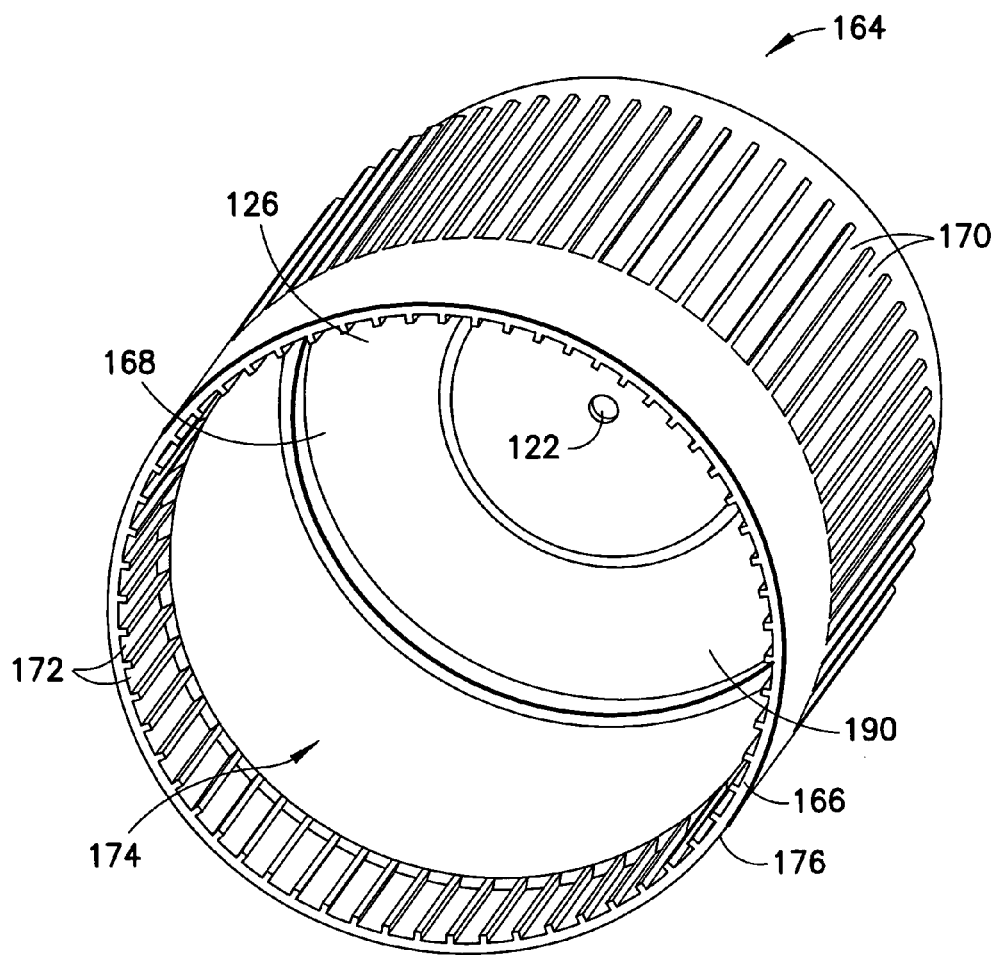
FIG. 38 is a perspective view of the outer micro-filter element shown in FIG. 37 taken from an opposite side.

As seen in FIG. 36, the first filter element 104 sits on the base plate 108. The first filter element is the same as that described above with reference to the other embodiments. The second filter element 164 has a general cup shape. More specifically, the second filter element 164 comprises side walls 166 having a general tube shape and a cup bottom section 168 substantially closing one end of the second filter element. As seen best in FIGS. 37 and 38. The cup bottom section 168 has a shape substantially the same as the cover member 118. More particularly, the cup bottom section 168 has a hole 122 and two receiving sections 124, 126. However, in alternate embodiments any suitable shape(s) could be provided for the second filter element. The side walls 166 also comprise grooves 170 and 172 on the inside and outside surfaces. The grooves 170, 172 can extend any suitable height(s) of the side walls 166, or might not be provided. The side walls 166 and cup bottom section 168 form an interior container area 174.

The second filter element 164 is preferably comprised of a molded or formed porous plastic or polymer material. However, it could be cut from a block of material. Molded or formed porous plastic or polymer filter members have been used in the medical industry, such as Mupor™ porous Polytetrafluoroethylene (PTFE) sold by Porex Corporation of Fairburn, Ga. Mupor™ porous PTFE can have a 5 micron pass size and can have a thickness of only 2 mm. In alternate embodiments the thickness of the second filter element 106 could be any suitable thickness (more or less than 2 mm) and could comprise a varying thickness at different locations. Porex Corporation also manufactures porous plastic members made of other polymer material(s), perhaps mixed with other material(s), such as for example Polyvinylidene Fluoride (PVDF), PE, PP, PDVF, EVA, NYLON 6, TPU, SCP, polyphenylene sulfide resin, polyolefin, thermoplastic binder powder, PPS, glass fibers, micro-spheres, round carbon fiber activated carbon material, ABS, ABS/PC, Acetals, CA, CP, CAB, LCP, Nylons (PA), PBT, PEEK, PEI, PC, PPO, TPE and TPU. Any suitable polyamide could be used to form a porous plastic member.

Figure 39:
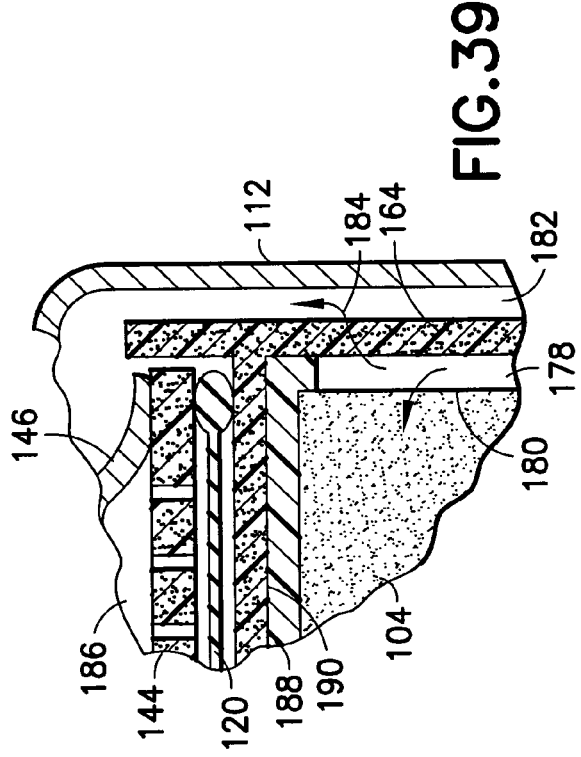
FIG. 39 is a partial cross sectional view of the filter assembly shown in FIG. 34.

In this embodiment, the second filter element 164 is comprised of a molded porous plastic or polymer material, such as PTFE or PVDF for example, with a 1-2 micron pass size. However, in alternate embodiments the material could have a larger or smaller pass size. The second filter element 164 has a general invented cup shape. The second filter element 164 is mounted over the first filter element 104. The end 176 of the second filter element 164 is attached to the base plate 108, such as with a sealant, epoxy or adhesive. The grooves 172 can provide a path for oil to enter the space 178 (see FIG. 39). Referring also to FIG. 39, incoming oil can flow from the inlet in the base plate 108 to the space 178 between the inside surface of the side wall 166 and the exterior surface of the first filter element 104. The oil can than take one of two additional path sections until it gets to the open area inside the first filter element 104 and out the outlet through the base plate 108. The oil can travel through the first filter element 104 into the open area as shown by arrow 180. The oil can also travel through the side wall 166 of the second filter element 164 into a space 182 between the exterior surface of the side wall 166 and the interior side of the cover 112 as shown by arrow 184. The oil in this second path 184 can travel up to the top open area 186 and through the holes of the support plate 144 (when not blocked by the flutter valve 120) and through the hole 122 in a bottom of the general cup shape of the second filter element (when not blocked by the flutter valve 120) to enter the open area inside the first filter element 104 and remix with the oil that when through the first filter element and exit from the filter assembly. The grooves 170 can provide the space 182 and still allow the cover 112 to contact the second filter element 164 for a firm secure assembly.

In this embodiment, the second filter element 164, because of its shape and position, has a much larger surface area for oil to enter into the second filter element. Thus, a smaller pass size, such as 1 micron, 2 microns or 3 microns for example, can be used in the material which makes the second filter element. The larger surface area allows greater cleaning of the oil using the second path 184. The grooves 170, 172 also increase surface area. However, the grooves need not be provided. The assembly can comprise a sealant, epoxy or adhesive 188 to seal the bottom surface 190 except at proximate the hole 122.

With this embodiment the second filter element 164 could have a larger micro pass size (such as 5 microns for example) and thereby provide a longer working life for the filter assembly than a small size second filter element which would clog sooner. Alternatively, the second filter element could have a smaller micro pass size (such as 2 microns for example) and thereby provide a cleaner filtered oil. Alternatively, or additionally, the size of the hole 122 could be larger; the size of the surface area of the second filter element and its pass size controlling the rate of flow rather than the size of the hole 122. It may also be possible to use the invention without the flutter valve.

Figure 40:
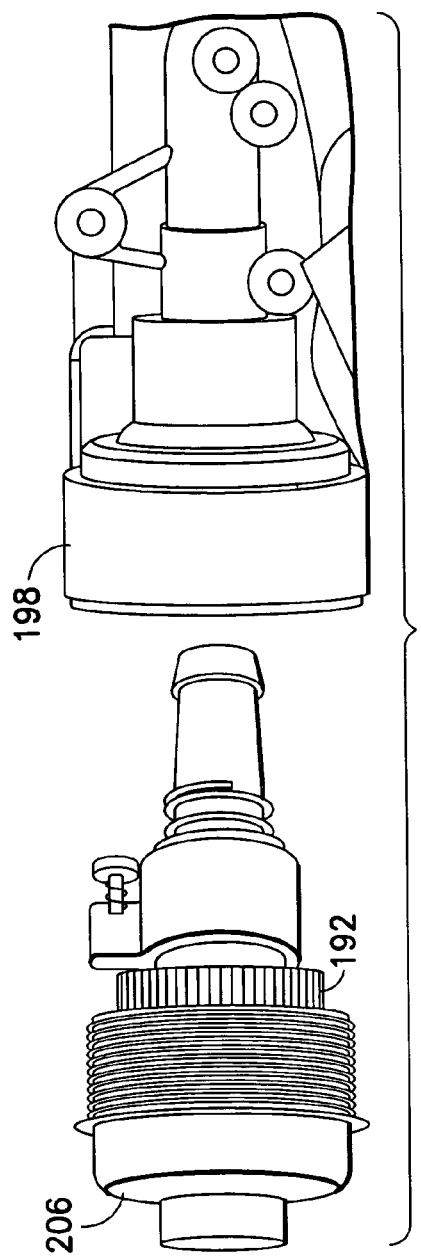
FIGS. 40-42 are views of oil filters and cut away sections of housings members used in European style cars which could be adapted to include features of the invention.
Figure 41:
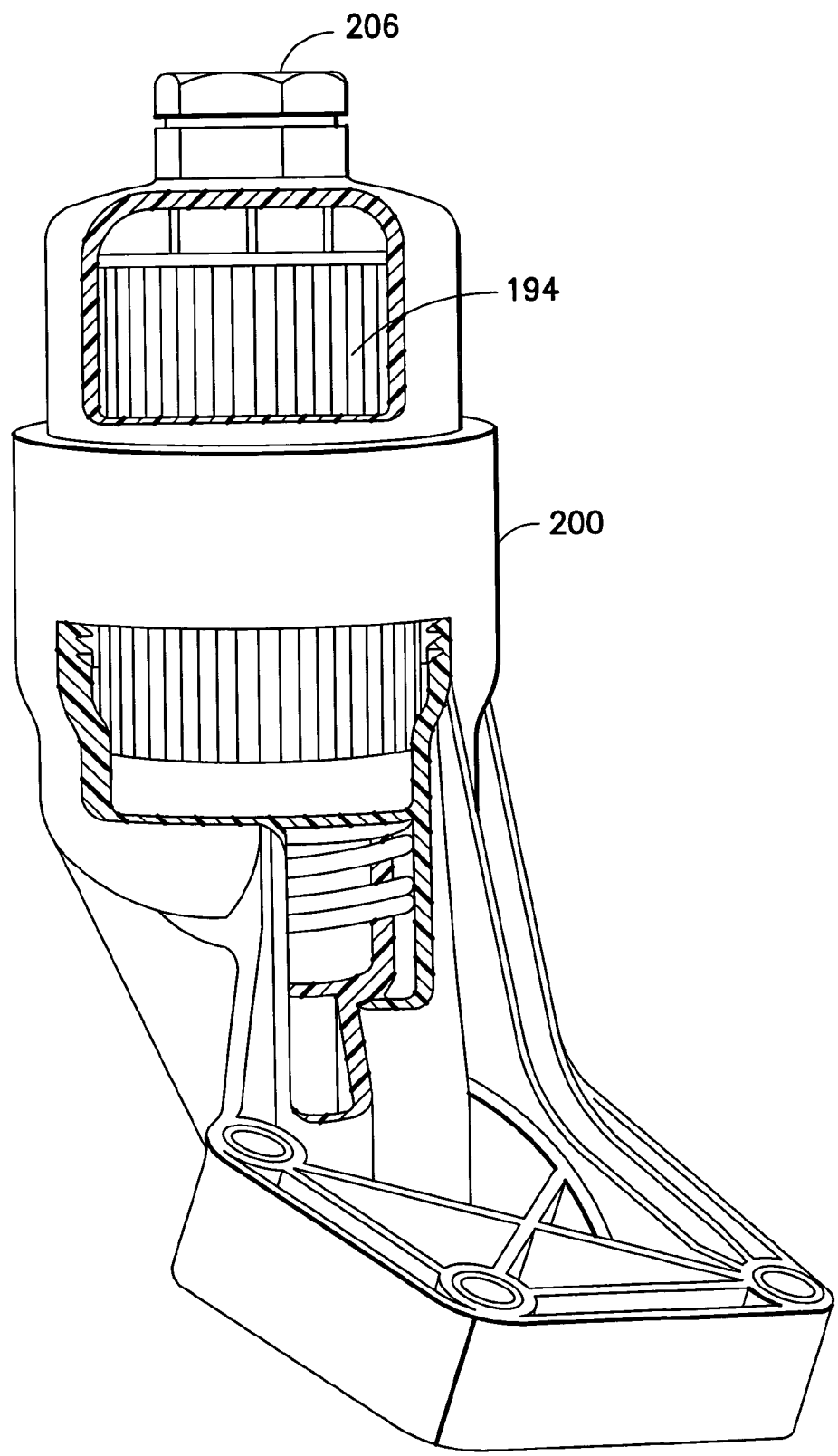
Figure 42:
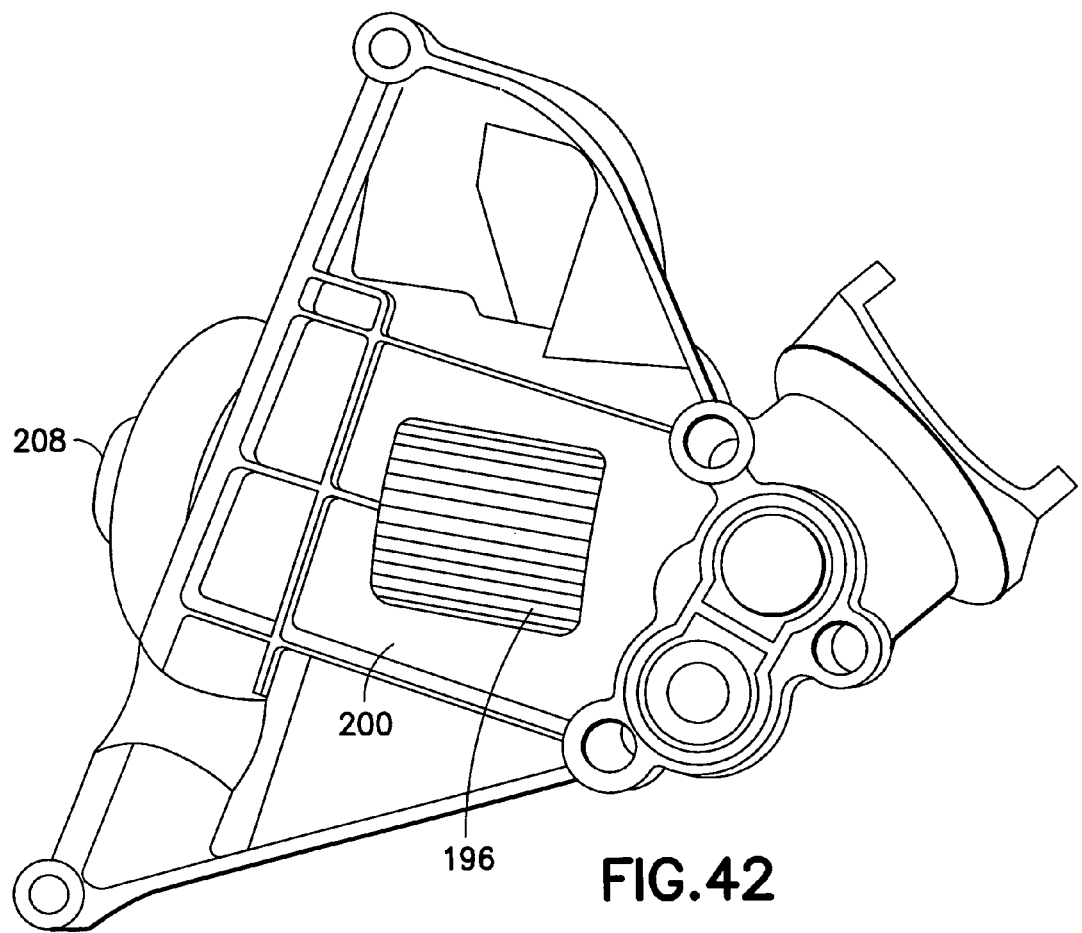

Referring now to FIGS. 40-42, views of different oil filters 192, 194, 196 and cut away sections of housings members 198, 200, 202 used in European style cars which could be adapted to include features of the invention. The designs include a screw on cap 204, 206, 208 (206 and 208 which are shown with cut away sections) which are screwed into the housing members 198, 200, 202 to capture the oil filters 192, 194, 196. The oil filters do not have their own outer cover. Instead, the housing members 198, 200, 202 and caps 204, 206, 208 function as the outer covers. With this type of embodiment, the caps and/or the housing members could be configured to removably receive the micro filter element and provide a second path to the micro filter element.

Figure 43:
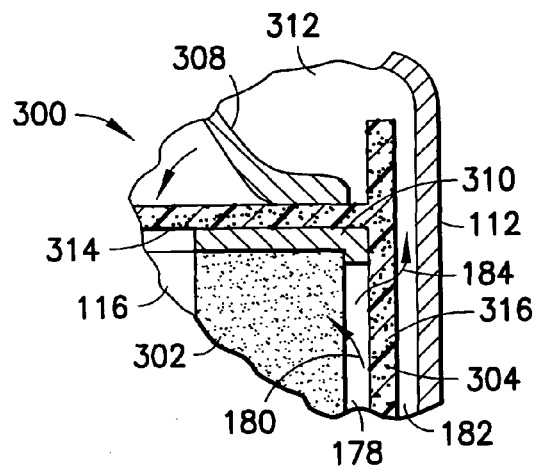
FIG. 43 is a partial cross sectional view of another alternate embodiment of the invention.

Referring now also to FIG. 43 another alternate embodiment is shown. In this embodiment a filter assembly 300 is provided comprising a first filter element 302, a second different filter element 304, an exterior housing 112, a spring 308, and a seal 310. The first filter element 302 is the same as the filter element 104, but could be different. The second filter element 304 is the same as filter element 164 except the second filter element 304 does not comprise the hole 122. Space 178 is provided between the outer perimeter of the first filter element 302 and the inner side perimeter of the second filter element 304. Fluid, such as oil, can flow into the first filter element 302 from the space 178 as indicated by arrow 180. Fluid can flow into the second filter element 304 from the space 178 and into space 182 as indicated by arrow 184. The fluid in space 182 can flow into top area 312, back through the second filter element 304 at the top section 314, and into open center space 116 of the first filter element 302.

Unlike the embodiment shown in FIG. 39, in this embodiment the filter does not comprise a flutter valve or the plate 144. This is because the second filter element is substantially rigid. Instead, the spring 308 biases the second filter element 304 downward away from the top of the exterior housing 112. Thus, the fluid passes through the second filter element 304 twice at the two filtering locations 314, 316. Seal 310 can be a preformed seal or can comprise a sealing adhesive material or similar material. The spring 308 is preferably comprised of molded silicon, but could be made of other material(s), such as metal for example, or any other forming process.

With the embodiment shown in FIG. 43 the first filter element 302 filters a majority of the flow of oil through the filter. The second filter element 304 only filters a small percentage of the oil flow through the filter. However, substantially the entire top surface of the second filter element can be used to filter the oil; the top surface of the second filter element occupying a majority of the cross sectional area of the filter assembly 300 (such as over 95 percent for example). The sides wall 316 also provides an increased surface area. Thus, the height of the filter assembly can be the same as a conventional filter assembly or smaller. The present invention can be used without increasing the height of a filter assembly as compared to conventional filter assemblies.

With the present invention a conventional filter element could be used for the first filter element 302. Thus, Society of Automotive Engineers (SAE) testing of the filter assembly 300 might not be needed again. This is because the first filter element 302 would function the same as a conventional filter in a conventional filter assembly even if the second filter element 304 became completely clogged. Thus, the first and second filter elements function independently from each other. The present invention could merely comprise adding the second new filter element 304 and enlarging the housing accordingly. The invention can provide the advantage of an inexpensive manufacture by using previously designed components from conventional filters. Thus, the entire filter does not need to be redesigned.

Figure 44:
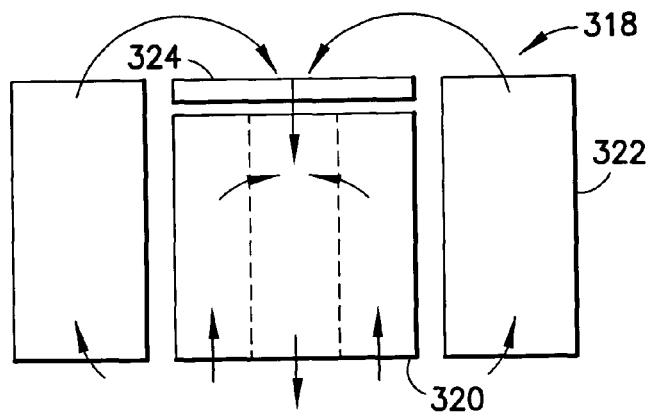
FIG. 44 is a diagram illustrating another alternate embodiment of the invention.

Referring also to FIG. 44 another alternate embodiment is shown. In this embodiment the filter assembly 318 comprises three filter elements 320, 322, 324. The first filter element 320 is the same as the filter element 104, but could be different. The second filter element 322 is the same as the filter element 21, but could be different. The third filter element 324 is the same as the filter element 142, but could be different. The third filter element 324 can filter particles having a smaller size that the second filter element 322. Fluid can flow through the second and third filter elements 322 and 324 in series. Thus, larger particles can be filtered by the second filter element 322 before they reach the third filter element 324.

Figure 45:
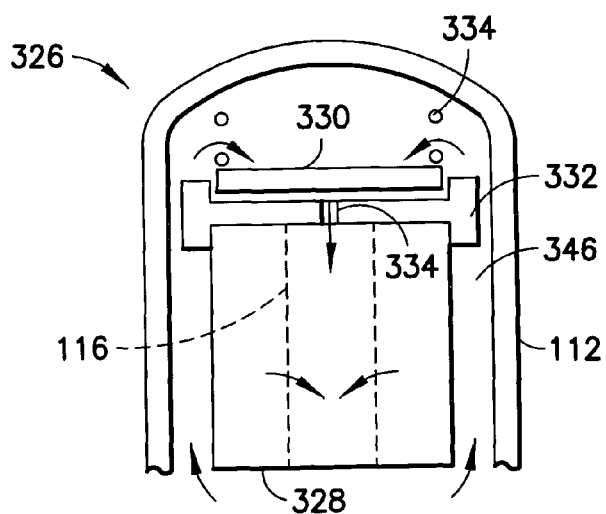
FIG. 45 is a diagram illustrating another alternate embodiment of the invention.
Figure 46:
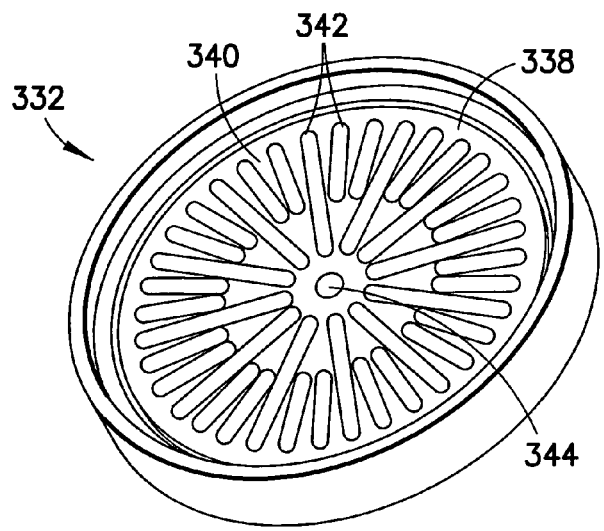
FIG. 46 is a perspective view of the holder shown in the assembly of FIG. 45.
Figure 47:
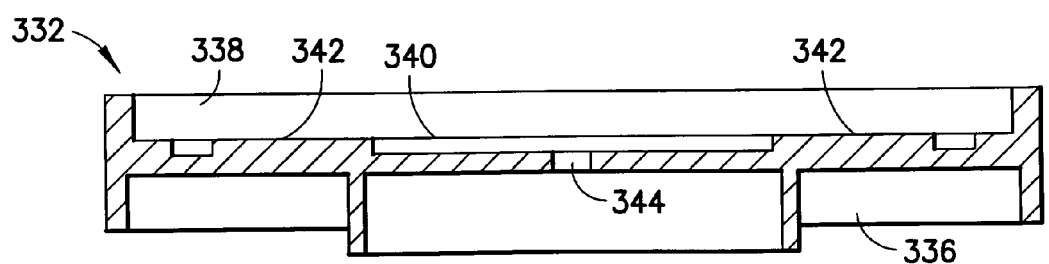
FIG. 47 is a cross sectional view of the holder shown in FIG. 46.

Referring also to FIGS. 45-47 another alternate embodiment is shown. In this embodiment the filter assembly 326 comprises a housing 112, a first filter element 328, a second filter element 330, a holder 332 and a spring 334. The first filter element 328 is the same as the filter element 104, but could be different. The second filter element 330 is the same as the filter element 142, but could be different.

The holder 332 sits on top of the top side of the first filter element 328 and is preferably sealed with the top side of the first filter element by a sealant, such as epoxy for example. As seen best in FIGS. 46 and 47, the holder 332 generally comprises a bottom receiving area 336 which receives a top portion of the first filter element 328. The holder also has a top receiving area 338 which receives a bottom portion of the second filter element 330. A top side 340 of the holder 332 has spacer ribs 342 and a hole 344 extends between the top and bottom receiving areas. The second filter element 330 sits in the top receiving area 38 on top of the ribs 342. The spring 334 biases the components 330, 332 and 328 together against a bottom section of the housing 112.

The spacer ribs 342 provide a path between the bottom of the second filter element 330 and the hole 344 for fluid to flow into the hole 344 after the fluid exits from the second filter element 330. The holder is preferably made of a plastic or polymer material such that fluid cannot flow through the holder except through the hole 344. As seen in FIG. 45, fluid can flow into space 346. A majority of this fluid flows through the first filter element 328, but a portion (such as about 2-5 percent for example) flows up past the outside of the holder 332, down through the second filter element 330 and through the hole 334 to mix with the fluid from the first filter element at area 116.

Figure 48:
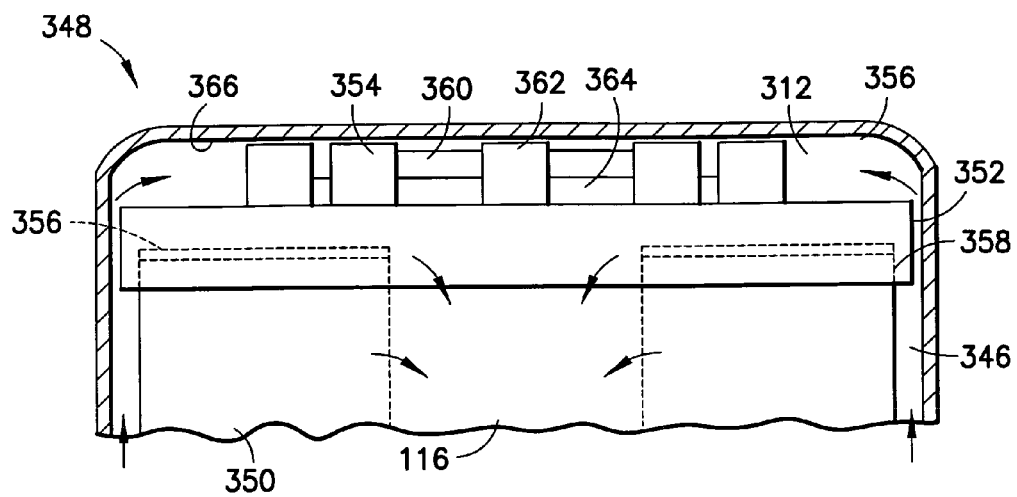
FIG. 48 is a partial cut-away view of another alternate embodiment of the invention.
Figure 49:
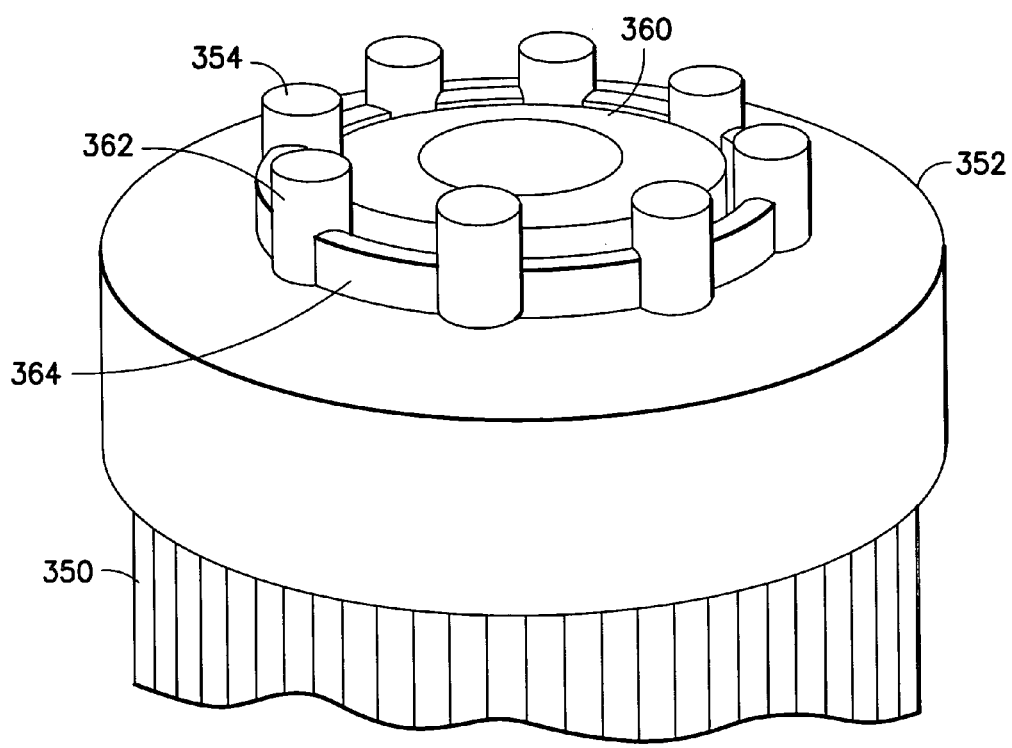
FIG. 49 is a partial perspective view of components of the assembly shown in FIG. 48.

Referring also to FIGS. 48-49, another alternate embodiment is shown. In this embodiment a filter assembly 348 is provided which comprises a housing 112, a first filter element 350, a second filter element 352 and a spacer spring 354. The first filter element 350 is the same as the filter element 104, but could be different. The second filter element 352 is mounted directly on top of the top side of the first filter element 350 with a sealing adhesive 356 or similar material(s). The second filter element 352 is comprised of a molded polymer material the same as the filter 106 except for the shape of the second filter element 352. The second filter element 352 is preferably comprised of a molded or formed porous plastic or polymer material, such as Mupor™ porous PTFE sold by Porex Corporation of Fairburn, Ga. Porex Corporation also manufactures porous plastic or polymer members made of other polymer materials, such as PE, PP, PDVF, EVA, NYLON 6, TPU, and SCP. Any suitable polyamide could be used to form a porous plastic member. In this embodiment, the second filter element 352 has an annular bottom receiving area 358 which receives the top side of the first filter element 350. A top side of the second filter element 352 has a center portion 360 which extends upward. In alternate embodiments other shapes could be provided.

The spacer spring 354 is preferably comprises of a resiliently deformable material, such as silicon or a polymer material. The spacer spring is preferably molded into the shape shown, but any suitable manufacturing process could be used. The spacer spring 354 has a general ring shape. In this embodiment the spacer spring 354 comprises spacer sections 362 and connecting sections 364. The spacer sections 362 contact the top side of the second filter element 350 and the bottom side 366 of the top of the housing 112. Thus, the top of the housing is kept spaced from the top side of the second filter element 352. This embodiment allows for every fast assembly of the filter with a reduced number of components.

Fluid can flow into annular space 346. A majority of this fluid flows through the first filter element 350, but a portion (such as about 2-5 percent for example) flows up past the outside of the second filter element 352 into area 312, through the lateral side of the second filter element and down through the top side of the second filter element 352 to mix with the fluid from the first filter element at area 116.

Figure 50:
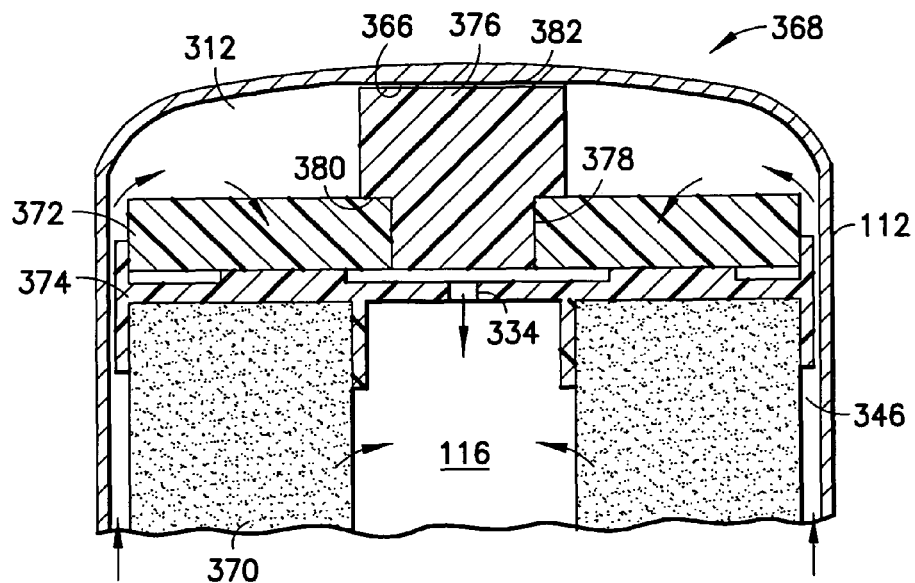
FIG. 50 is a partial cross sectional view of another alternate embodiment of the invention.
Figure 51:
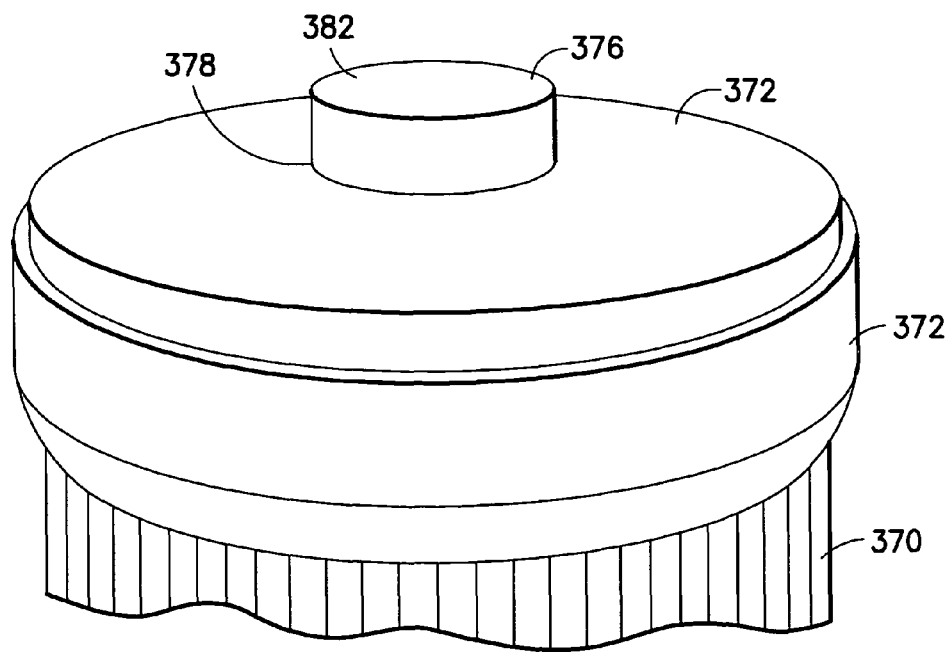
FIG. 51 is a partial perspective view of components of the assembly shown in FIG. 50.
Figure 52:
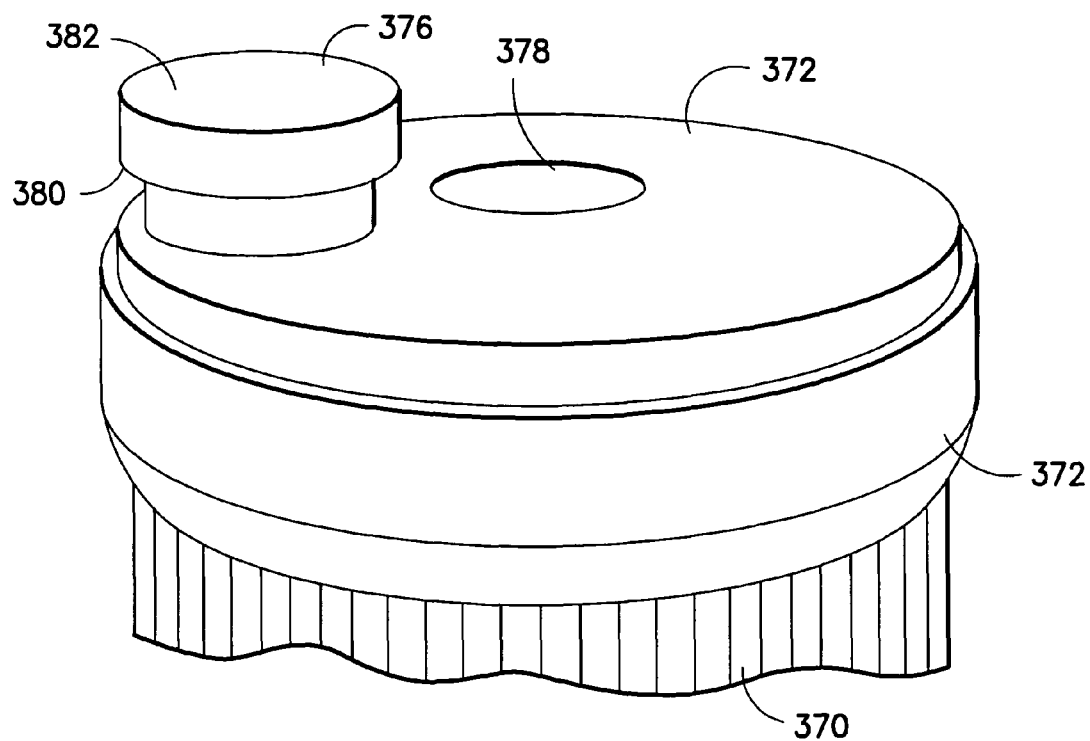
FIG. 52 is a partial perspective view of components of the assembly shown in FIG. 51 with the spacer plug removed for illustration purposes only.

Referring also to FIGS. 50-52, another alternate embodiment is shown. In this embodiment the filter assembly 368 comprises a housing 112, a first filter element 370, a second filter element 372, a holder 374 and a spacer spring 376. The first filter element 370 is the same as the element 104, but could be different. The holder 374 is the same as the holder 332 shown in FIGS. 46-47, but could be different. The second filter element 372 has a general disk ring shape with a center aperture 378. The second filter element 372 is preferably an extruded polymer member made of a material similar to the filter element 352, such as Mupor™ porous PTFE sold by Porex Corporation of Fairburn, Ga. Porex Corporation also manufactures porous plastic or polymer members made of other polymer materials, such as PE, PP, PDVF, EVA, NYLON 6, TPU, and SCP. Any suitable polyamide could be used to form a porous plastic member. In alternate embodiments other shapes could be provided. However, by extruding the porous filter material in a column shape and cutting it to height as it is extruded, the cost of manufacture of the second filter element 372 can be greatly reduced.

The center aperture 378 forms a seat for the spacer spring 376. The spacer spring 376 is preferably comprised of a slightly deformable plastic or polymer material or rubber for example. The spacer spring 376 has a generally plug shape with a bottom facing surface 380 that sits on top of the top surface of the second filter element 372. The top surface 382 rests against the bottom surface 366 of the top section of the housing 112. Thus, the spacer 376 functions to keep the top of the housing 112 spaced from the top of the second filter element 372 to provide the space 312. The second filter element 372, because it is substantially rigid, keeps the bottom surface 384 of the spacer 376 spaced from the hole 334.

Incoming fluid can flow into annular space 346. A majority of this fluid flows through the first filter element 370, but a portion (such as about 2-5 percent for example) flows up past the outside of the second filter element 372 into area 312, down through the second filter element 372, and through the hole 334 to mix with the fluid from the first filter element at area 116.

Figure 53:
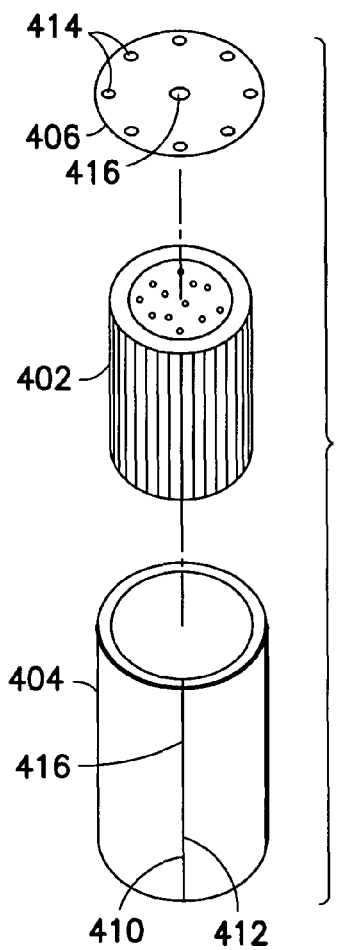
FIG. 53 is an exploded perspective view of portions of another alternate embodiment of the present invention.
Figure 54:
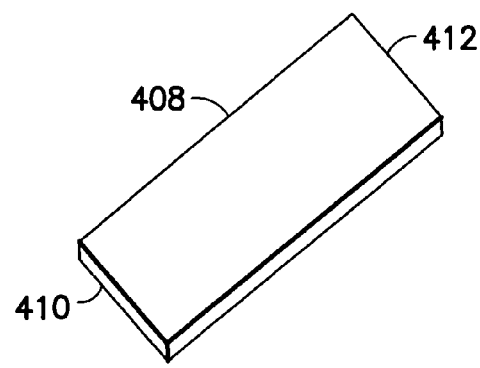
FIG. 54 is a perspective view of a sheet of filtering material used to form the second filter element shown in FIG. 53.

Referring now to FIG. 53, another alternate embodiment will be described. The housing is not shown merely for the sake of clarity. In this embodiment the filter assembly has a first filter element 402, a second filter element 404 and an interior top plate 406. The first filter element 402 is the same as the first filter element 104, but could be different. The second filter element 404 has a general tube shape with an open top and bottom into the interior of the tube shape. Referring also to FIG. 54, the second filter element 404 comprises a sheet 408 of filtering material which is bent or rolled into the tube shape and then its ends 410, 412 are attached to each other.

The ends are preferably sealed with each other by a sealant or other seal 416. The sheet 408 is not pleated, but it could be. Instead, the sheet 408 is preferably comprised of a porous polymer member, such as described above, carbon with a Nylon binder for example.

The interior top plate 406 has outer holes 414 to allow fluid to pass from the exterior side of the second filter element 404 to the top side of the plate 406. The interior top plate 406 also has an inner hole 416 to allow fluid to pass from the top of the plate into the interior of the first filter element 402. Fluid can initially enter a gap between the two filter elements 402, 404 and pass through the two filter elements in opposite directions.

Figure 55:
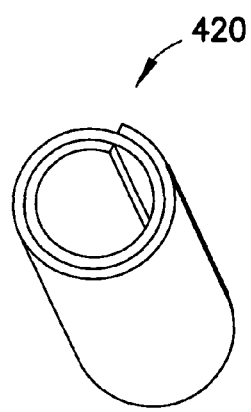
FIG. 55 is a perspective view of an alternate embodiment of the second filter element shown in FIG. 55.

FIG. 55 shows another embodiment of a second filter element comprised of a rolled sheet member. In this embodiment the sheet has been rolled around itself in a spiral type of configuration to form the tube shaped second filter element 420. This type of design can remove the need to seal the ends of the sheet with each other with the coil shape being tightly wound to form the seal.

Figure 56:
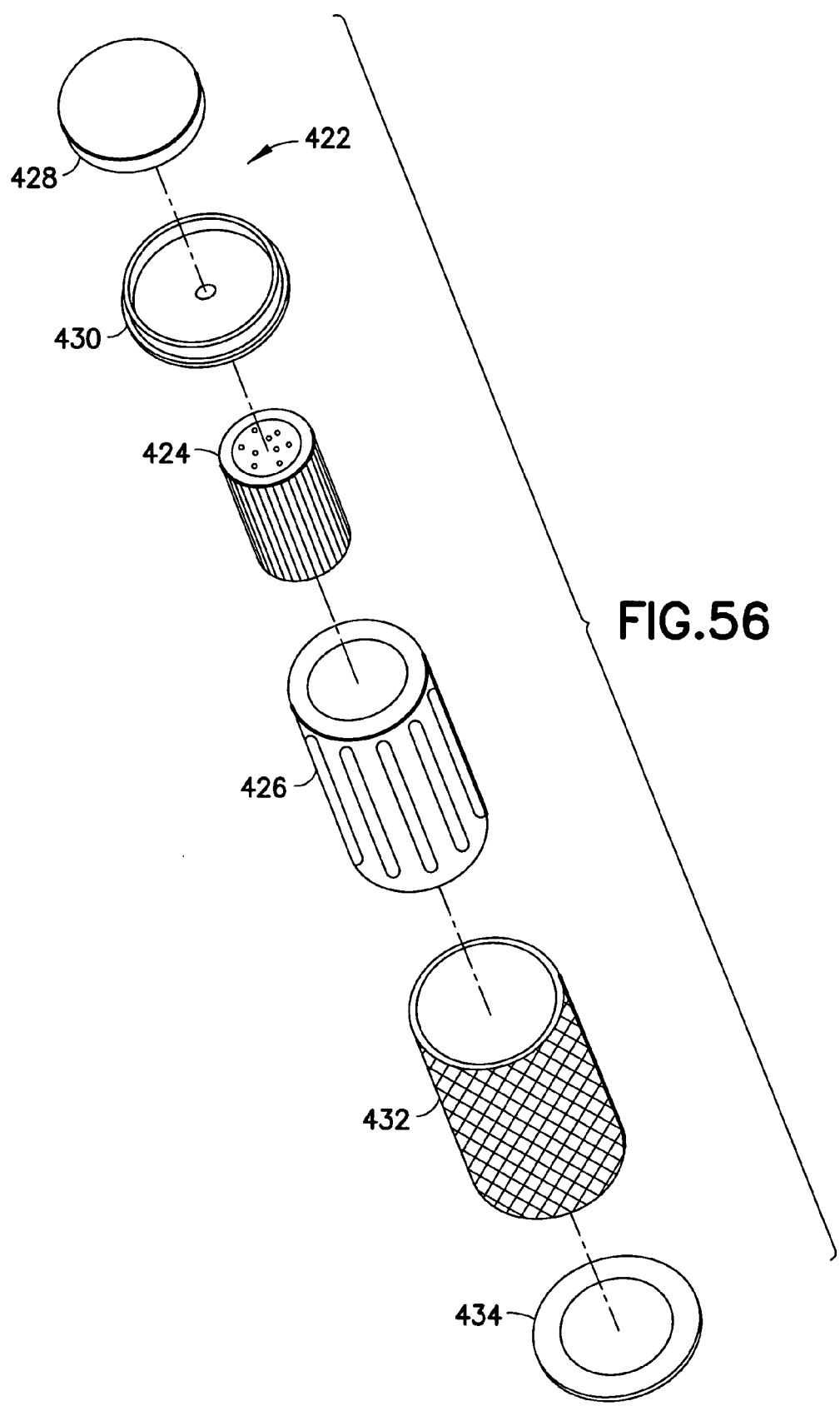
FIG. 56 is an exploded perspective view of portions of another alternate embodiment of the present invention.

Referring now also to FIG. 56 another embodiment is shown. The housing is not shown for the sake of clarity and the assembly would preferably comprise a spring, such as the spring 146 for example. In this embodiment the filter assembly 422 comprises a first filter element 424, a second filter element 426, a third filter element 428, a top holder 430, a mesh screen 432, and a bottom seal 434. The first filter element 402 is the same as the first filter element 104, but could be different.

The second filter element 404 has a general tube shape with an open top and bottom into the interior of the tube shape. The second filter element is preferably comprised of a combined carbon fiber and polymer member, such as a molded or extruded member. The screen 432 surrounds the second filter element 426. The screen 432 prevents particles which might flack off of the second filter element 426 from reaching the third filter element 428. The seal 434 seals the bottom of the second filter element 426. A seal (not shown) seals the top of the second filter element 426 at the top holder 430.

The first filter element 424 is located insider the second filter element 426 with its top sealed against the bottom side of the holder 430. The holder 430 is the same as the holder 118. The third filter element 428 comprises a flat disk, such as the filter element 142. In a preferred embodiment, the three filter elements 424, 426, 428 are adapted to filter different size particles such as 40-10 microns, 10-5 microns, and 5-2 microns respectively for example. A disk shaped mesh screen (not shown) could also be provided between the third filter element 428 and the holder 430 to prevent tiny pieces of the filter 428 from entering the engine if they inadvertently break off of the third filter element.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A liquid filter assembly comprising:
   a first liquid filter element adapted to filter particles larger than a first size;
   a second different liquid filter element adapted to filter particles larger than a second size, the second size being smaller than the first size, where the second filter element comprises a polymer porous member, where the second filter element is a one-piece member with a substantially solid, rigid disk shape, and where the one-piece member has a general disk shape with a height substantially smaller than a width of the general disk shape;
   a holder having a bottom side located at a top side of the first filter element, wherein the holder has a portion located along a side height of a lateral outer side of the second liquid filter element such that the second liquid filter element is retained in a seat of the holder;

a housing having the first and second liquid filter elements therein, the liquid filter assembly forming a first liquid flow path having the first liquid filter element therein and a second liquid flow path having the second liquid filter element therein, wherein the first and second flow paths are at least partially separate; and a spring located directly between the one-piece member and the housing, wherein the spring directly biases the one-piece member directly against the holder.

2. A liquid filter assembly as in claim 1 further comprising a flutter valve resilient flap sheet located on a top side of the holder, and a structural member located above the flutter valve resilient flap sheet and biased by the spring against at least a portion of a top side of the flutter valve resilient flap sheet.

3. A liquid filter assembly as in claim 1 wherein the holder is a separate member from the second filter element, and wherein the second filter element is located at a top side of the holder.

4. A liquid filter assembly as in claim 3 further comprising a flutter valve resilient flap sheet located between the second filter element and the holder.

5. A liquid filter assembly as in claim 1 wherein the one-piece porous polymer member comprises a molded or die cast porous polymer member.

6. A liquid filter assembly as in claim 1 wherein the one-piece porous polymer member comprises an one-piece extruded porous polymer member.

7. A liquid filter assembly as in claim 1 wherein the one-piece porous polymer member comprises a substantially flat disk shape.

8. A liquid filter assembly as in claim 1 wherein the one-piece porous polymer member comprises polytetrafluoroethylene (PTFE).

9. A liquid filter assembly as in claim 1 wherein the one-piece porous polymer member comprises a pore size of about 5 microns or less.

\* \* \* \* \*